(12) United States Patent
Kon

(10) Patent No.: US 11,421,974 B2
(45) Date of Patent: Aug. 23, 2022

(54) SENSOR DEVICE WITH IMPROVED STABILITY

(71) Applicant: TEIJIN LIMITED, Osaka (JP)

(72) Inventor: Tatsuichiro Kon, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 17/259,240

(22) PCT Filed: Oct. 10, 2018

(86) PCT No.: PCT/JP2018/037647
§ 371 (c)(1),
(2) Date: Jan. 11, 2021

(87) PCT Pub. No.: WO2020/017068
PCT Pub. Date: Jan. 23, 2020

(65) Prior Publication Data
US 2021/0293520 A1    Sep. 23, 2021

(30) Foreign Application Priority Data

Jul. 20, 2018  (JP) .............................. JP2018-136554

(51) Int. Cl.
*G01B 7/16*    (2006.01)
*H04L 67/12*   (2022.01)

(52) U.S. Cl.
CPC ................ *G01B 7/18* (2013.01); *H04L 67/12* (2013.01)

(58) Field of Classification Search
None
See application file for complete search history.

(56) References Cited

U.S. PATENT DOCUMENTS 9,449,740 B2 *   9/2016   Eshima ................. H01B 7/182
2011/0079410 A1 * 4/2011  Eshima ............. H01B 11/1821
                                                        174/24

FOREIGN PATENT DOCUMENTS

JP           04-233443 A       8/1992
JP         2009-301880 A      12/2009
                (Continued)

OTHER PUBLICATIONS

European Search Report dated Jul. 27, 2021 in European Application No. 18926634.9.
(Continued)

*Primary Examiner* — Lisa M Caputo
*Assistant Examiner* — Nigel H Plumb
(74) *Attorney, Agent, or Firm* — Sughrue Mion, PLLC

(57) ABSTRACT

A sensor device has improved stability and includes: a sensor member having a core using a core material having a residual strain at 2% elongation of 0.4% or less, a conductor which has an electrical resistance of 1 kΩ/m or less and which is wound round an outer surface portion of the core in a coil form, an electromagnetic wave shielding layer for shielding the conductor from an extraneous electromagnetic wave, and an insulating layer having an electrical insulation function between the conductor and the electromagnetic wave shielding layer; and a measuring means for detecting an electric signal from the sensor member to measure an elongation of the sensor member based on a change of the electric signal; wherein the core material has various properties including a tensile modulus of 1 to 250 GPa and the core has a diameter of 0.08 to 0.6 mm.

6 Claims, 7 Drawing Sheets

(56) References Cited

FOREIGN PATENT DOCUMENTS

| | | |
|---|---|---|
| JP | 2011-089923 A | 5/2011 |
| JP | 2015-200592 A | 11/2015 |
| JP | 2017-511476 A | 4/2017 |

OTHER PUBLICATIONS

International Search Report of PCT/JP2018/037647 dated Jan. 15, 2019 [PCT/ISA/210].
International Preliminary Report on Patentability with translation of the Written Opinion dated Jan. 26, 2021 in International Application No. PCT/JP2018/037647.

* cited by examiner

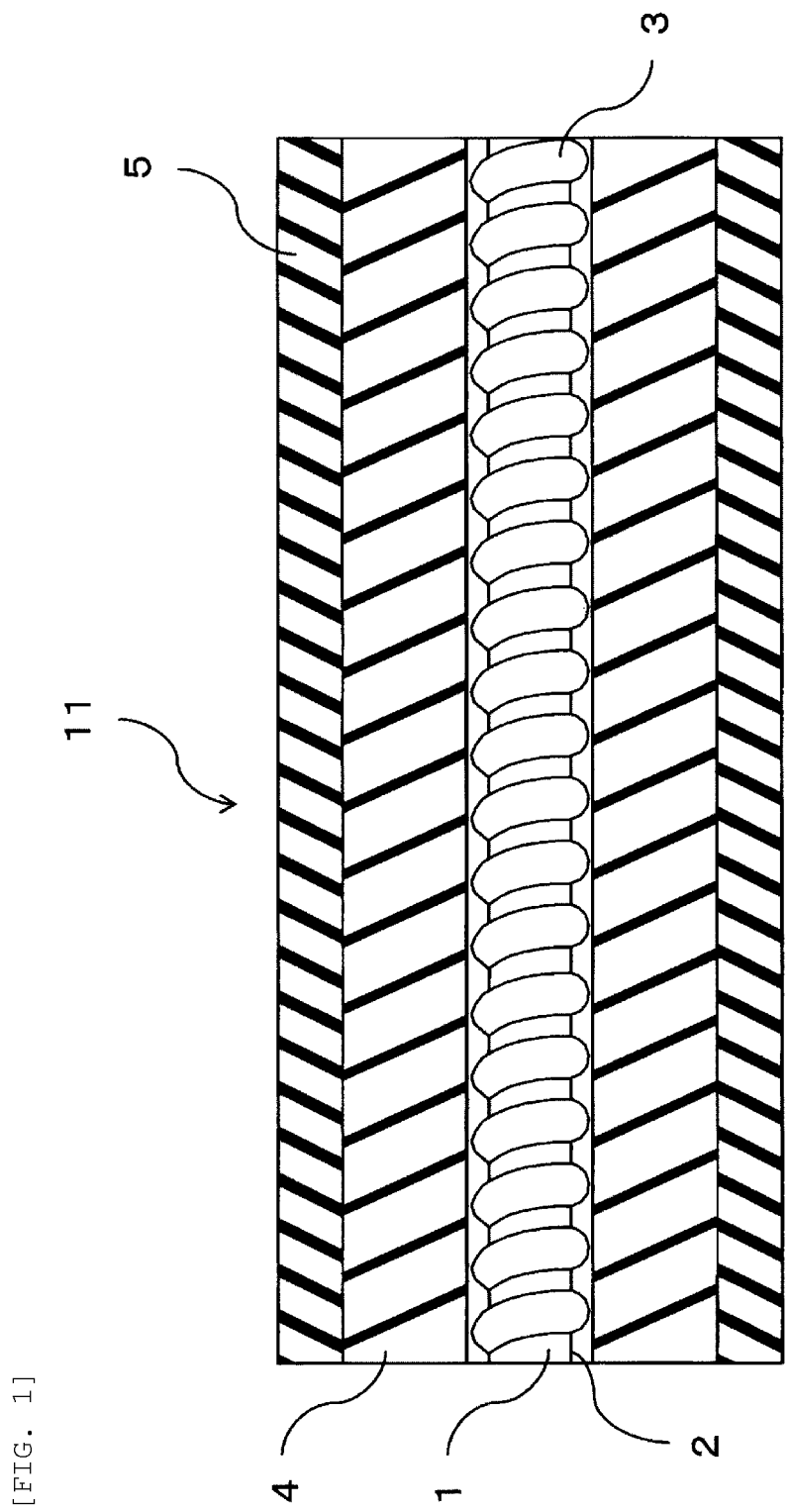
[FIG. 1]

[FIG. 2]
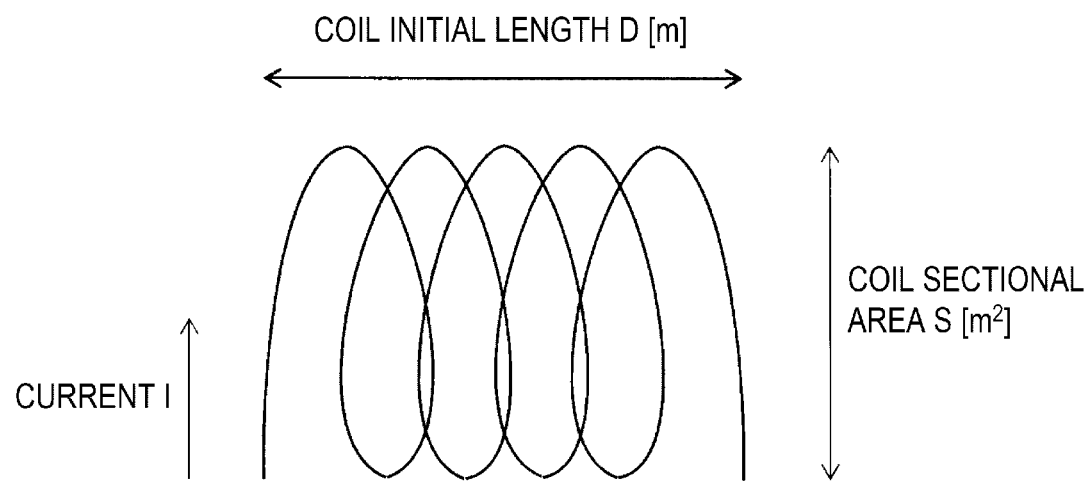

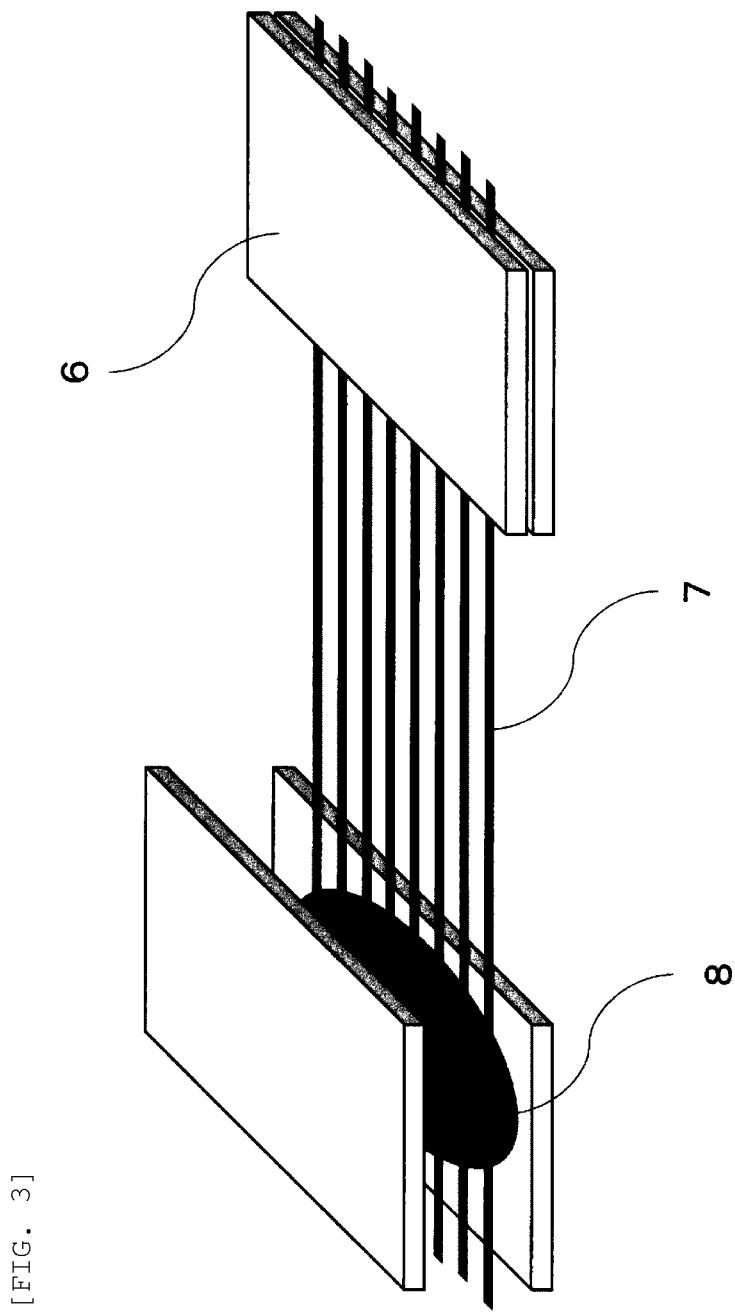
[FIG. 3]

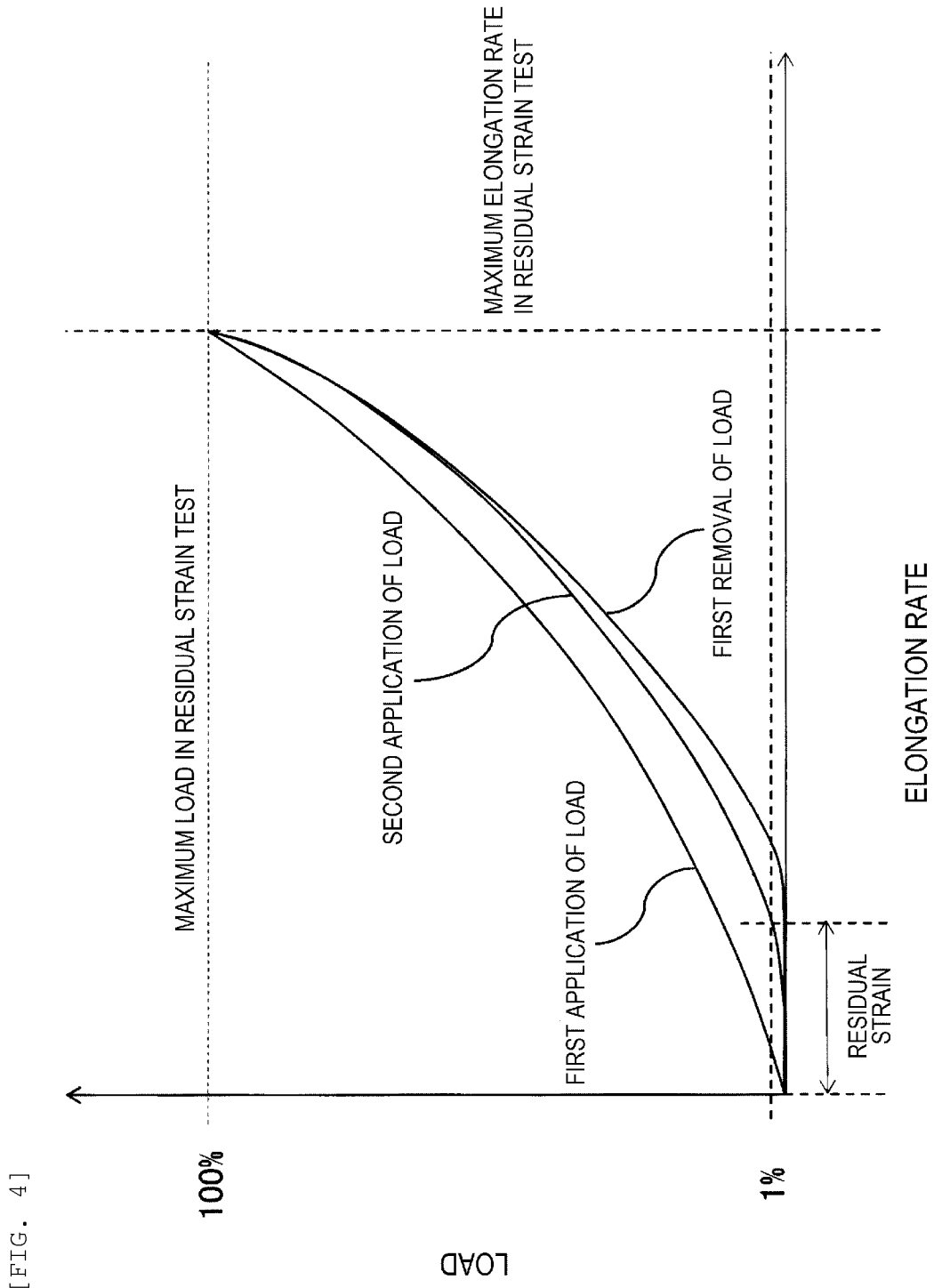
[FIG. 4]

[FIG. 5]
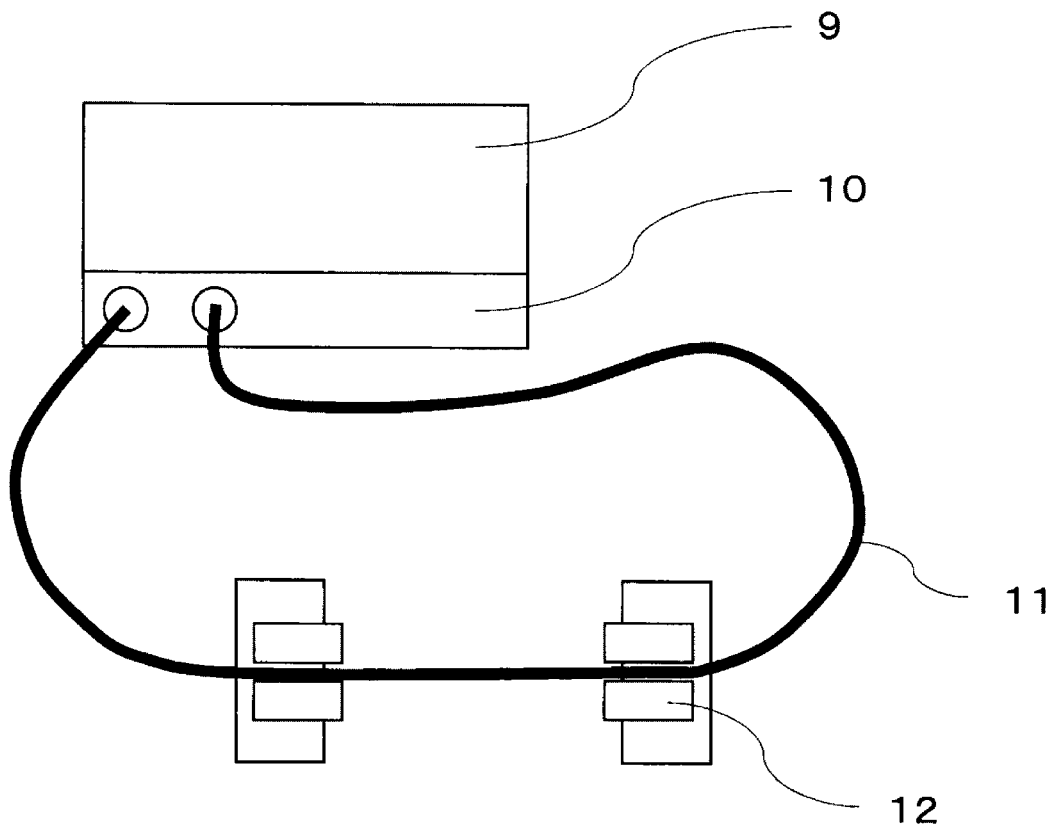

[FIG. 6]
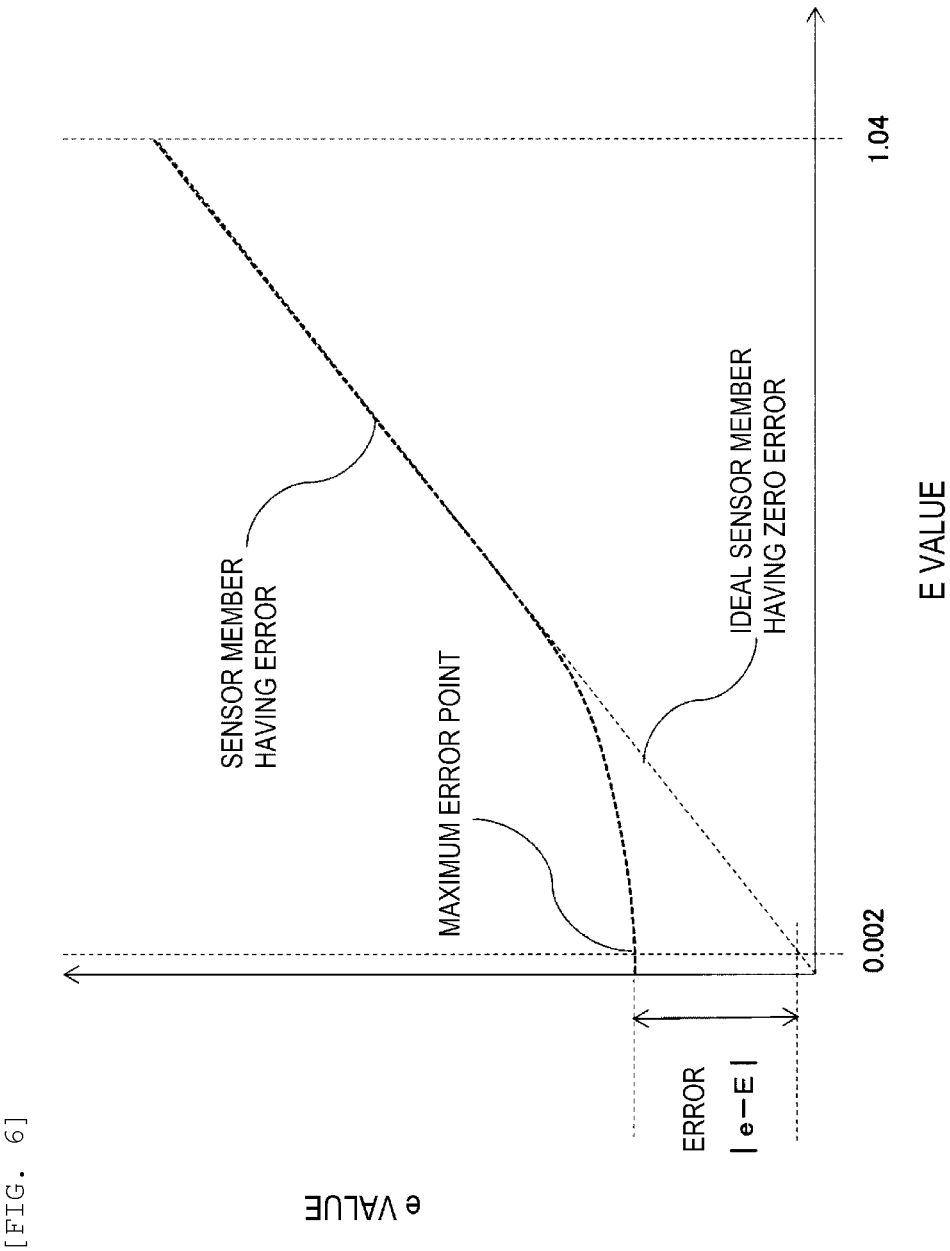

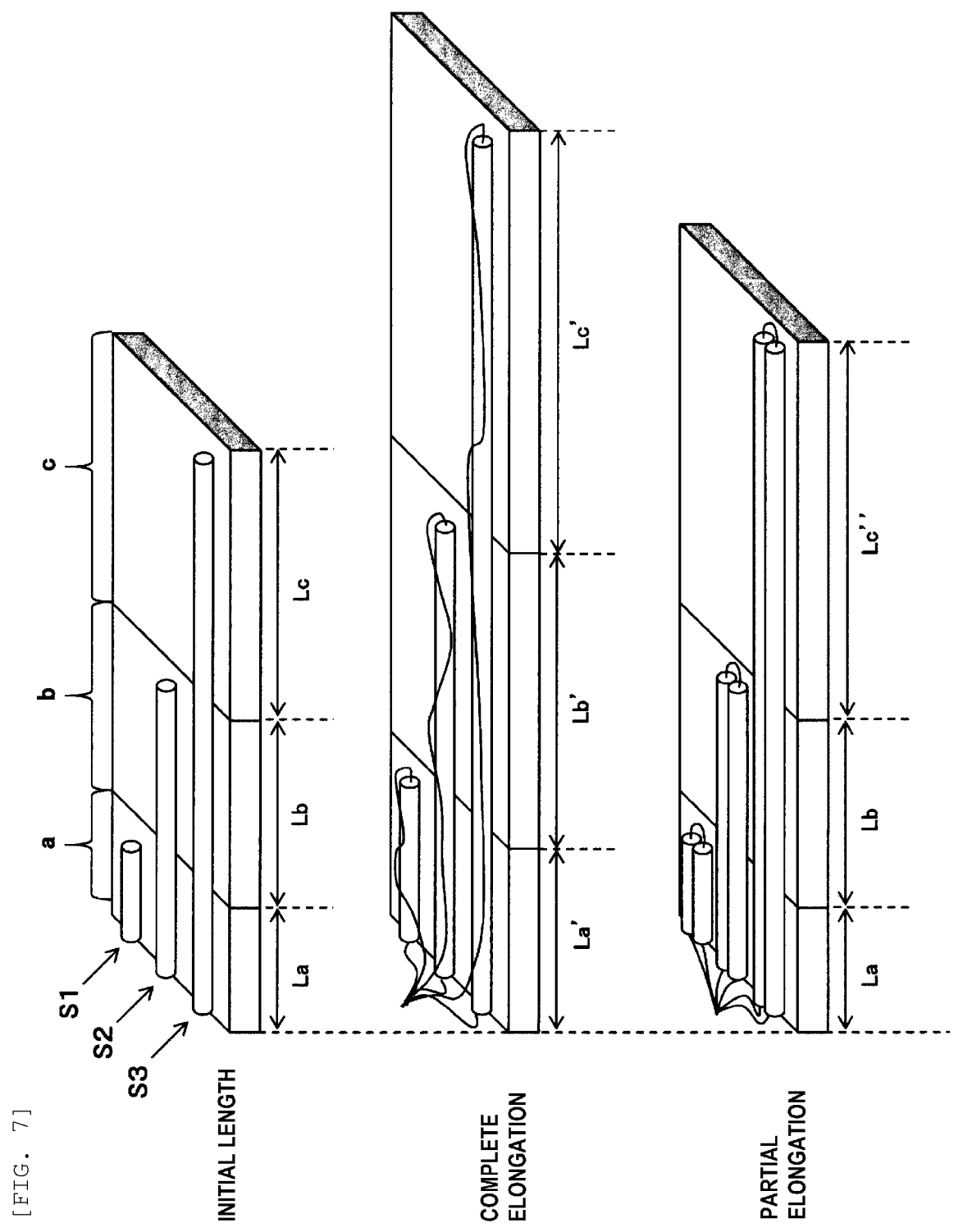
[FIG. 7]

SENSOR DEVICE WITH IMPROVED STABILITY

CROSS REFERENCE TO RELATED APPLICATIONS

This application is a National Stage of International Application No. PCT/JP2018/037647 filed on Oct. 10, 2018, claiming priority based on Japanese Patent Application No. 2018-136554 filed on Jul. 20, 2018.

TECHNICAL FIELD

The present invention relates to a sensor device for measuring (monitoring) an elongation and a displacement of a measurement specimen with high precision and with ease.

BACKGROUND ART

Conventionally, for preventing a measurement specimen from suffering fracture due to deterioration by fatigue or due to temporary load of a large stress on the specimen, a sensor device for measuring an elongation or a displacement has been used, and a sensor device which can measure an elongation or a displacement with high precision and with ease while maintaining durability is desired.

For example, as a means for measuring an elongation, there has been known a sensor device (PTL 1) using an elastic substrate as a core, wherein the sensor device detects an impedance change of a coiled structure having a conductor made of a metal wound round the elastic substrate, measuring an elongation displacement in the axial direction of the elastic substrate.

CITATION LIST

Patent Literature

PTL 1: JP-A-2011-89923

SUMMARY OF INVENTION

Technical Problem

When the elastic substrate of the sensor device as shown in PTL 1 is stretched in the axial direction (lengthwise direction), the axial dimension of the substrate after stretched is likely to be larger than that of the substrate before stretched (plastic deformation occurs). The plastic deformation includes plastic deformation of the conductor made of a metal and plastic deformation of the elastic substrate, but the effect of plastic deformation of the elastic substrate which directly controls the axial dimension (length) is larger. For this reason, when an elastic substrate having large plastic deformability relative to the elongation displacement is used, the repeated dimensional properties (reversibility) in the measurement of an elongation become poor, and therefore there is a problem in that the precision of the measurement conducted in such an environment that a repeated load is continuously applied is lowered.

Further, when the plastic deformation of the conductor made of a metal is larger, the repeated dimensional properties (reversibility) in the measurement of an elongation are adversely affected, and therefore suppression of such plastic deformation of the conductor is a problem to be solved.

In view of the above-mentioned problems, an object of the present invention is to provide a sensor device which is advantageous not only in that the sensor device is suitable for non-destructive and continuous measurement and further has high repeatability, but also in that the sensor device has high stability and reliability even when used in a severe surrounding environment, such as an outdoor environment.

Solution to Problem

The sensor device of the present invention has a sensor member having a core using a core material having a residual strain at 2% elongation of 0.4% or less, a conductor which has an electrical resistance of 1 kΩ/m or less, and which is wound round the outer surface portion of the core in a coil form, and an electromagnetic wave shielding layer for shielding the conductor from an extraneous electromagnetic wave, and a measuring means for detecting an electric signal from the sensor member to measure an elongation of the sensor member based on a change of the electric signal. It is preferred that the core material has a tensile modulus of 1 to 250 GPa, as measured at 25° C., and it is preferred that the sensor device has an insulating layer having an electrical insulation function between the conductor and the electromagnetic wave shielding layer.

Further, it is preferred that the measuring means has a detector for detecting an impedance change, and an arithmetic part for conducting a calculation of an elongation amount and/or an elongation ratio of a measurement specimen based on the impedance change, and it is further preferred that the arithmetic part conducts a calculation of an elongation amount and/or an elongation ratio based on an inductance change among the values detected by the detector. The measuring means may have a judgment means for judging an abnormal state of the sensor member and/or measurement specimen.

Advantageous Effects of Invention

In the present invention, there are provided a sensor device which enables measurement with high precision and with ease, and a method for measuring an elongation displacement using the sensor device.

BRIEF DESCRIPTION OF DRAWINGS

FIG. 1 A diagrammatic view of the sensor member in the invention (partial cross-sectional view).

FIG. 2 A diagrammatic view showing the principle of the measurement method using the sensor device of the invention.

FIG. 3 A diagrammatic view showing a test specimen for residual strain and creep test of the core material.

FIG. 4 A diagrammatic graph showing the method for measuring a residual strain of the sensor member in the invention.

FIG. 5 A diagrammatic view showing the test evaluation method for the sensor member in the invention.

FIG. 6 A diagrammatic graph showing the relationship between the E value and the e value when measuring an elongation of the sensor member, and the error of measurement.

FIG. 7 Diagrammatic views showing an example of the measurement method using a plurality of the sensor members in the invention.

DESCRIPTION OF EMBODIMENTS

Hereinbelow, an embodiment of the present invention will be described in detail.

The invention is a sensor device which has: a sensor member having a core using a core material having a residual strain at 2% elongation of 0.4% or less, a conductor which has an electrical resistance of 1 Ω/m or less, and which is wound round the outer surface portion of the core in a coil form, and an electromagnetic wave shielding layer for shielding the conductor from an extraneous electromagnetic wave; and a measuring means for detecting an electric signal from the sensor member to measure an elongation of the sensor member based on a change of the electric signal. The core having the conductor wound round the surface thereof is referred to as "sensor body". As shown in FIG. 1, sensor member 11 has a core 1 using a core material having a residual strain at 2% elongation of 0.4% or less, a conductor 3 which has an electrical resistance of 1 Ω/m or less and which is wound round the outer surface portion 2 of the core in a coil form, an electromagnetic wave shielding layer 5 for shielding the conductor from an extraneous electromagnetic wave, and an insulating layer 4 having an electrical insulation function between the conductor 3 and the electromagnetic wave shielding layer 5.

With respect to the core used in the sensor member in the invention, a core material, such as a fiber (a multifilament or a monofilament), a film, or a tape, can be used. In the case of a film or a tape, it is preferred that, before used, the film or tape is preliminarily subjected to twisting so as to have a cross-sectional shape close to a circular form. Further, it is preferred that the core material is selected from at least one of an organic fiber, an inorganic fiber, a natural fiber, a metal or metal fiber having the surface coated with an insulating layer, and the like.

With respect to the residual strain at elongation of the core, it is preferred that the plastic deformability is low, and it is more preferred that the residual strain at 2% elongation at 25° C. of the core material, as measured in a general environment for use, particularly, as measured under the below-mentioned conditions, is 0.4% or less. Further, it is preferred that the residual strain at 3% elongation at 25° C. is 0.4% or less, and it is especially preferred that the residual strain at 4% elongation at 25° C. is 0.4% or less. When the residual strain at elongation of the core material is in the above-mentioned range, high repeatability in the measurement can be achieved.

Further, with respect to the residual strain at elongation of the core material at a high temperature, it is preferred that the residual strain at 2% elongation at 60° C., as measured under the below-mentioned conditions, is 0.4% or less, it is more preferred that the residual strain at 3% elongation at 60° C. is 0.4% or less, and further it is especially preferred that the residual strain at 4% elongation at 60° C. is 0.4% or less. When the residual strain at elongation of the core material at a high temperature is in the above-mentioned range, the core material can be used even in a severe surrounding environment, such as an outdoor environment, making it possible to deal with a temperature increase due to direct sunlight in an outdoor environment, or a temperature increase of the sensor member due to an external force, friction, or the like caused by a wind, a vibration, or the like. When the core material does not satisfy the deformation recovery rate at elongation as measured under the above-mentioned temperature conditions, the sensor member is disadvantageously poor in the repeatability in the measurement or poor in the stability when used for a long term.

With respect to the core material which satisfies the above-mentioned conditions, for example, the followings can be mentioned. The fiber used in the core material may be either a monofilament or a multifilament.

Inorganic fibers: Examples include a glass fiber, a silica fiber, and aluminum oxide, and especially preferred is a glass fiber (for example, E glass) having silicon oxide as a main component mixed with two or more other inorganic components.

Organic fibers (polymer fibers): Examples of fiber materials (core materials) having a residual strain at 2% elongation of 0.4% or less include a para-type aromatic polyamide fiber (for example, a polyparaphenylene terephthalamide fiber, "Twaron", manufactured by Teijin Limited), a para-aramid fiber of a copolymer type (for example, a copolyparaphenylene-3,4'-oxydiphenylene.terephthalamide fiber, "Technora", manufactured by Teijin Limited), a PBO fiber (for example, "Zylon", manufactured by Toyobo Co., Ltd.), a PEEK fiber (for example, manufactured by ZYEX), a PEK fiber, a PEKK fiber, a PPS fiber (for example, "Torcon", manufactured by Toray Industries Inc.), a PTT fiber (for example, "SOLOTEX", manufactured by Asahi Kasei Corporation), a PET fiber (for example, "Tetoron", manufactured by Teijin Frontier Co., Ltd.), a PEN fiber, and a liquid crystalline polyester fiber (for example, "Vectran", manufactured by Kuraray Co., Ltd., and "Zxion", manufactured by KB Seirein Ltd.).

With respect to the above-mentioned various materials, one which has been subjected to a certain type of processing so as to satisfy the requirement of the residual strain in the invention may be used, and, for example, if necessary, the material may be subjected to heat treatment under a tension or under no tension as an after-treatment to relax the residual stress of the fiber or to improve the crystallinity or orientation degree or the like, stabilizing the fiber structure.

Further, the treatment is preferably performed in the state in which the conductor is tightly wrapped around the core as mentioned below. Winding the conductor round the core is preferably conducted in the state in which a high tension is applied to the conductor, but, in this instance, the core needs to maintain linearity while resisting the tension in the conductor, and therefore it is necessary to apply an appropriate tension to the core according to the tension in the conductor. By virtue of this, in winding the conductor round the core by means of a covering machine or the like in the step of producing the sensor body, the frictional force between the conductor and the core can be increased, making it possible to stabilize the diameter of the coil form of the conductor. When the tensile modulus of the core is not satisfactorily high, a disadvantage is caused in that the conductor is wound round the core which is in a state of being considerably stretched due to the tension, and, when releasing the tension after winding, the core suffers marked shrinkage in the lengthwise direction, causing lowering of the quality, such as making it difficult to retain the shape of the sensor body or to achieve an uniform winding pitch of the coil or an uniform diameter.

Further, in the sensor member being used, repeated pulling deformation may cause the conductor to suffer plastic deformation, and a dimensional change of the conductor adversely affects the measurement precision of the present sensor device. For minimizing the adverse effect, it is effective to achieve such a relationship that (the tensile modulus of the core material×the sectional area of the core) is at least 5 times or more (the tensile modulus of the coiled conductor in the axial direction×the sectional area of the coiled conductor), so that the low plastic deformability of the core controls the plastic deformability of the whole sensor body to be low.

Therefore, with respect to the tensile modulus of the core material, the tensile modulus as measured at 25° C. is preferably 1 to 250 GPa, more preferably 10 to 150 GPa, further preferably 30 to 120 GPa, most preferably 50 to 100 GPa.

With respect to the tensile strength of the core material, for preventing a failure of breaking of the core during the production of the sensor member and for improving the resistance to various stresses when using the sensor member, the tensile strength of the core material as measured at 25° C. is preferably 0.1 GPa or more, more preferably 0.3 to 10 GPa, further preferably 1 to 10 GPa, especially preferably 2 to 10 GPa.

Further, from the viewpoint of the heat resistance, with respect to the tensile strength of the core material at a high temperature, the tensile strength as measured at 60° C. is preferably 0.1 GPa or more, further preferably 0.3 to 10 GPa, particularly preferably 1 to 10 GPa, especially preferably 2 to 10 GPa.

When the core material does not satisfy the tensile strength as measured under the above-mentioned temperature conditions, the sensor member disadvantageously highly possibly suffers fracture due to an external force, or brittleness.

The tensile creep of the core material is crucial to the long-term reproducibility of the measurement precision, and therefore is preferably as small as possible, and the creep rate of the core material as measured at 25° C. using a test load corresponding to 30% of the breaking strength at 25° C. is preferably 0.00001 to 0.003%/minute, more preferably 0.00001 to 0.001%/minute, further preferably 0.00001 to 0.0005%/minute, especially preferably 0.00001 to 0.0003%/minute.

Further, from the viewpoint of the heat resistance, the tensile creep of the core material at a high temperature is preferably low, and the creep rate of the core material as measured at 60° C. using a test load corresponding to 30% of the breaking strength of the core at 60° F. is preferably 0.00001 to 0.003%/minute, more preferably 0.00001 to 0.001%/minute, further preferably 0.00001 to 0.0005%/minute, especially preferably 0.00001 to 0.0003%/minute.

When the core material does not satisfy the tensile creep as measured under the above-mentioned temperature conditions, the sensor member is disadvantageously poor in the repeatability in the measurement or poor in the stability when used for a long term.

With respect to the tensile elongation at break of the core material, the tensile elongation at break as measured at 25° C. is preferably 2 to 100%, more preferably 3 to 50%, further preferably 4 to 30%.

Further, from the viewpoint of the heat resistance, with respect to the tensile elongation at break of the core material at a high temperature, the tensile elongation at break as measured at 60° C. is preferably 2 to 100%, more preferably 3 to 50%, further preferably 4 to 30%.

When the elongation of the core material as measured under the above-mentioned temperature conditions is less than 2%, the range of the elongation ratio which the sensor member or sensor device can measure is disadvantageously narrowed. On the other hand, when the elongation of the core material is more than 100%, the core is disadvantageously so easily stretched that the handling properties in the production process become poor.

Further, in view of improving the sensor member in thermal stability in practical use, the core material preferably has small thermal shrinkage, and, when the core material is allowed to stand under no tension in a dry environment at a humidity of 30% or less at 60° C. for 2 hours, the dimensional shrinkage of the core material in the lengthwise direction is preferably 1% or less, more preferably 0.7% or less, further preferably 0.5% or less, most preferably 0.3% or less. When the core material does not satisfy the above-mentioned dimensional shrinkage rate, there is disadvantageously a possibility that the dimension is unlikely to be stable, causing an adverse effect on the measurement precision.

The core material may be preliminarily subjected to heat treatment for lowering the thermal dimensional shrinkage. Specifically, there can be used a treatment in which the core material is allowed to stand under no tension in a high temperature environment to relax the residual strain of the core material, suppressing thermal shrinkage, a treatment in which the molecular orientation of the core material is improved or crystallization in the core material is advanced by a treatment of applying a high tension at a high temperature, suppressing thermal relaxation of the molecular structure (heat setting treatment), or the like.

It is preferred that the core is in a state that a secondary structure, such as twisting or braiding, is reduced. Specifically, with respect to the twist conditions for the fiber in the core after winding the conductor, the twist multiplier is preferably 1.0 or less, more preferably 0.8 or less, further preferably 0.6 or less, most preferably 0.4 or less. The twist multiplier is represented by: twist multiplier=the number of turns of twisting of fiber per length of 1 m (turns/m)× (fineness of the core (tex))$^{1/2}$/1.055. Thus, by reducing the influence of the secondary structure, it is possible to improve the precision in the measurement.

For example, when the core is formed from a fiber, the above-mentioned secondary structure indicates an increase of the elongation due to a secondary structure (structural stretch) of the fiber by imparting appropriate twist to the fiber or braiding several fibers. When subjecting the fiber to twisting or braiding, further plastic deformation derived from such a secondary structure may be caused, and the twisting or braiding conditions are required to be appropriately set depending on the object to be measured or measurement precision according to the aim of use.

With respect to the core material, a monofilament having no element of twist may be used. In the process of winding the conductor round the core, a frictional force or the like may cause the core to be twisted, and therefore, taking into consideration the twist caused in the winding, the twisted state of the core before winding may be preliminarily controlled.

Further, the diameter of the core is preferably 0.02 to 300 mm, more preferably 0.04 to 30 mm, further preferably 0.06 to 3 mm, especially preferably 0.08 to 0.6 mm. The diameter of the core is an approximate diameter, which is a value corresponding to the diameter of a true circle having the same area as the area of the cross-section of the core. When the diameter of the core is too small, upon winding the conductor round the core, it is difficult to uniformly wind the conductor, and thus such a failure that the loops of the conductor being wound overlap is likely to occur. On the other hand, when the diameter of the core is too large, the flexing properties and flexing durability are disadvantageously likely to become poor, and further force of tight wrapping of the conductor around the core is likely to be unsatisfactory, and thus the frictional force between them disadvantageously becomes unsatisfactory so that the conductor and the core easily mutually slide, causing the winding pitch of the conductor to be uneven.

As mentioned below, in the sensor device of the invention, it is preferred that an inductance change or the like is measured as an electric signal and, from the measured value, an elongation displacement of the core is determined. In a solenoid coil, an inductance is proportional to a permeability, and therefore, when an inductance change is used in measuring an elongation displacement, it is preferred that the transmittance of the core corresponding to the core of the conductor is high. That is, with respect to the core, it is preferred that the relative permeability (no unit), which is the ratio of the permeability of a substance to the permeability in a vacuum, is small. Specifically, the relative permeability of the core is preferably 1 to 10,000, more preferably 1 to 1,000, further preferably 1 to 100, especially preferably 1 to 10. When the relative permeability of the core is in the above-mentioned range, the ratio of the sensor signal intensity to the noise intensity (S/N ratio) is improved, making it possible to improve the measurement precision. However, when the relative permeability is outside of the above-mentioned range, that is, the relative permeability is too high, there is a concern that an absolute value of inductance is so large that the alternating current impedance is increased, causing a large load on the electric processing of a sensor signal, making the continuous measurement difficult.

As examples of the method for increasing the relative permeability of the core, there can be mentioned a method in which fine particles of a high permeability material are dispersed in a polymer resin or polymer fiber constituting the core to forma composite, and a method in which a polymer resin or polymer fiber constituting the core is coated with fine particles of a high permeability material. Examples of such high permeability materials include permalloy, iron, ferrite, silicon steel, ferrite, carbon steel, nickel, and aluminum. Of these, ferrite fine particles have excellent handling properties and are especially preferred.

With respect to the core, the conductor is wound round the outer surface portion of the core, and therefore it is preferred that the core has insulation properties in the surface thereof. For example, when a fiber having conductive properties is used as the core, it is desired that an insulating layer is formed on the interface (or contact surface) between the core and the conductor. Further, if necessary, the core may be subjected to coating for increasing the frictional force or adhesion with the conductor.

The increase of the frictional force between the core and the conductor is advantageous in respect of the stability of the production of the sensor body and handling in the use of the sensor body, and therefore it is preferred to use the core which is unlikely to slide on the conductor. That is, preferred is the core having a predetermined coefficient of static friction or more with respect to the conductor. However, the measurement of a coefficient of static friction in the sensor body is technically difficult, and therefore, as a substitute test, in a tensile test for the sensor body, the frictional force (sliding ability) may be evaluated by determining an elongation ratio of the sensor body in which the core and the conductor mutually slide.

With respect to the conductor used in the sensor member in the invention, a metal having conductive properties is preferred, and examples of such metals include copper, a copper alloy, and aluminum. When an inductance change is used as an electric signal for the sensor device of the invention, a change of the electrical resistance with time is unlikely to be caused due to surface oxidation or a flaw of the conductor or the like, and therefore satisfactorily stable measurement with high reliability can be achieved in a general environment, but the conductor may have plating on the surface. Examples of plating include silver plating and nickel, and plating makes it possible to further improve the effect of prevention of surface oxidation and the wear resistance. Further, from the viewpoint of the surface protection of the wound conductor, the prevention of short-circuiting, and the like, a conductor having the surface coated with an electrically insulating resin, i.e., a so-called enameled wire, or the like may be used.

With respect to the conductor, metal wires which are bound together and twisted may be used. By using such twisted wires as an inner structure of the sensor member, it is possible to further improve the durability to flexing and the like. For preventing the bound metal wires from electrically conducting to one another, a conductor coated with an insulating layer, such as an enameled wire, is preferably used.

The direct current resistance of the conductor is preferably 0.001 to 1,000 ($\Omega$/m), more preferably 0.01 to 100 ($\Omega$/m), further preferably 0.1 to 10 ($\Omega$/m). When the direct current resistance of the conductor is in the above-mentioned range, it is possible to improve the precision of the sensor, to lower the power consumption, and to improve the stability of the action. The resistance of the conductor may be appropriately selected depending on the length of the sensor member used, and it is preferred that, as the length of the sensor member used is increased, the conductor having a smaller resistance is used. For example, when the length of the sensor member used is 100 m or more, there is used the conductor preferably having a resistance of 10 $\Omega$/m or less, more preferably 5 $\Omega$/m or less, further preferably 2 $\Omega$/m or less.

When the form of the conductor is circular or substantially circular, the diameter of the conductor is preferably 0.01 to 3 mm, more preferably 0.015 to 1 mm, further preferably 0.02 to 0.2 mm. When the cross-section of the conductor has a non-circular form, it is preferred that the diameter of a virtual circle having an area equal to the sectional area of the conductor is determined and the diameter of the virtual circle is in the above-mentioned range. Further, the conductor may be in the form of a foil, and, when the conductor is in a foil form, the conductor preferably has a thickness of 0.01 to 0.5 mm. The width of the conductor is not particularly limited, but, from the viewpoint of ease of processing, the width is preferably 0.05 to 3 mm, more preferably 0.07 to 1 mm, further preferably 0.1 to 0.7 mm, most preferably 0.2 to 0.5 mm. When the diameter or thickness of the conductor is too large, the flexing durability tends to become poor, and, when the diameter or thickness of the conductor is too small, the strength is disadvantageously lowered, so that the conductor is likely to suffer fracture.

Further, it is preferred that, when winding the conductor round the outer surface portion of the core in a coil form, the conductor is arranged so that the loops of the coiled conductor adjacent to each other do not overlap. The reason for this is that, in the measurement using the sensor member in the invention, as a principle, a relative change of the inductance due to elongation of the winding pitch (or the number of winding per predetermined length) is used, and therefore overlapping of the loops of the coiled conductor is likely to hinder elongation of the winding pitch or the number of winding, causing an error of the measurement.

When the length of the sensor member used is very large (for example, 1,000 m or more), for the purpose of lowering the resistance of the conductor, a plurality of conductors may be stacked on one another, or the conductors may be arranged electrically in parallel. Specifically, the conductors may be arranged in parallel by, for example, a method in which a plurality of cores arranged in parallel are wound round the core, or a method in which a plurality of sensor cores, each of which has the conductor wound round the core, are twisted together to be in a state of a so-called aggregate wire. When the conductors are arranged in parallel, an error of measurement is caused as mentioned above, but a power loss due to an increase of the direct current resistance of the conductor can be suppressed, enabling long-distance measurement.

When a small diameter or thin metal is used as the conductor in the invention, the conductor in a coil form has a restoring force, but may suffer plastic deformation when exposed to deformation, such as excessive pulling or flexure. For this reason, in the sensor body in the invention, it is preferred that the conductor is wound so as to be tightly wrapped around a core having low plastic deformability to cause a satisfactory frictional force between them, so that the conductor is stretched or shrunk together with the core. Therefore, it is preferred that the conductor is strongly wound round the core with a predetermined force or more of tightness.

Further, the conductor indirectly receives the stress (tension) exerted on the sensor member through the core, and therefore the stress on the conductor itself is relatively low. For this reason, the conductor is unlikely to suffer breaking, fracture due to repeated fatigue, or the like, enabling a long-term use.

When the conductor is a so-called bare wire that has the surface which is not coated with an insulating layer, such as enamel coating, the gap in the loops of the coiled conductor adjacent to each other (coil gap) is preferably 0.01 to 3 mm, more preferably 0.03 to 0.6 mm, further preferably 0.04 to 0.4 mm, most preferably 0.05 to 0.15 mm.

By virtue of such a gap, in the conductor wound in a coil form, insulation properties can be secured between the loops of the coiled conductor adjacent to each other (coil gap), so that electric properties (such as an inductance) are stabilized. Meanwhile, when the gap in the loops of the coiled conductor adjacent to each other is too large, the amount of the magnetic flux leaked from the coiled conductor is increased, and an adverse effect, such as a reduction of the absolute value of inductance, is caused, so that the signal/noise ratio (S/N ratio) is likely to be unsatisfactory, and this is disadvantageous in view of achieving high measurement precision.

In the case using a conductor which has been preliminarily coated with an insulating layer of a resin or the like (such as an enameled wire), even when the gap in the loops of the coiled conductor adjacent to each other is zero, insulation between the loops of the coiled conductor adjacent to each other can be secured by the insulating layer.

In the case using the conductor which has been preliminarily coated with an insulating layer of a resin or the like, the conductor can be formed in such a form that two layers or three layers of the conductor are stacked and wound round the core so that a plurality of coil forms are stacked. In this instance, the inductance can be controlled by selecting conditions, such as the direction of winding or the number of winding of each layer, or the relative position of the layers being stacked. Further, by causing electrical short-circuiting in part of the layers, the inductance of another layer can be reduced using the action of a mutual inductance.

When short-distance measurement is conducted, it is likely that designing the inductance to be higher is advantageous, and thus the signal intensity or S/N ratio can be increased. On the other hand, when long-distance measurement is conducted, it is likely that designing the inductance to be lower is advantageous, and attenuation (transmission loss) of the signal intensity can be suppressed. Such design is preferably made taking into consideration mainly the size of the object to be measured, electric performance of the detector (instrument), and the like.

The number of winding of the conductor per core length of 1 m (the number of winding for coil) is preferably 250 to 100,000 T/m, more preferably 500 to 30,000 T/m, further preferably 1,000 to 18,000 T/m, especially preferably 2,000 to 12,000 T/m.

The number of winding (T/m) is proportional to a value of inductance, and therefore, by increasing the number of winding, an absolute value of inductance is increased, making it possible to improve the sensitivity of the sensor member. Meanwhile, when the number of winding is too large, the value of inductance is such large that the alternating current impedance is increased, so that a load on the detector (processing circuit for an electric signal) is disadvantageously increased.

It is preferred that the number of winding (T/m) is designed so that the characteristic impedance of the sensor member at a frequency for measurement of the electric properties has a value which is equal to or close to the input-output impedance of the detector (processing circuit for an electric signal) or the characteristic impedance of a relay cable for signal transmission or the like. Especially when a commercially available instrument (such as an impedance analyzer, an LCR meter, a network analyzer, or a high-function oscilloscope) is used as a detector, the input-output impedance of these instruments is generally designed to be 50 Ω, 75 Ω, 100Ω, or the like, and therefore the design is preferably made so that these impedance values match with the characteristic impedance of the sensor member, and it is preferred that, taking this into consideration, electrical parameters, such as the number of winding (T/m), the gap in the coil form, the permeability of the core, and the stray capacity between the conductor and the electromagnetic wave shielding layer, and the measurement frequency are designed.

In the sensor member in the invention, it is preferred that an electromagnetic wave shielding layer for shielding the conductor from an extraneous electromagnetic wave is disposed.

The electromagnetic wave shielding layer is a layer having high conductivity and/or high permeability, which is disposed on the outside of the sensor body (outside as viewed in the diameter direction), and has a function of absorbing and/or reflecting the electromagnetic field of an extraneous electromagnetic wave (from the external environment) entering the conductor. Specifically, the electromagnetic wave shielding layer is, for example, a layer which is continuously formed in the lengthwise direction of the sensor member by winding or braiding a metal wire or a metal foil made of a high conductivity material, such as silver, copper, nickel, gold, lead, or aluminum, or a magnetic wire or a magnetic foil made of a high permeability material, such as a ferrite (iron oxide alloy) or a permalloy (iron/nickel alloy), using the lengthwise direction of the sensor device as an axis. It is more preferred that, before the above-mentioned metal wire, metal foil, magnetic wire, or magnetic foil is wound or braided, if necessary, the step of winding once the wire or foil round the core of a fiber or the like is conducted for increasing the tensile strength or flexural strength of the wire or foil. The metal wire, metal foil, magnetic wire, or magnetic foil is preferably formed around the sensor member without a gap or while leaving as small a gap as possible, but the layer may have a gap as long as the electromagnetic wave shielding performance of the layer is not markedly lowered.

The electromagnetic wave shielding layer may function as a so-called ground, releasing the stray capacity generated inside the cable.

The electromagnetic wave shielding layer using a high conductivity material is preferably a layer having a high conductivity of 0.0001 to 10 Ω/m in the lengthwise direction of the sensor device, more preferably 0.0001 to 1 Ω/m, further preferably 0.0001 to 0.1 Ω/m.

The electromagnetic wave shielding layer using a high permeability material is preferably a high permeability layer having a relative permeability of 100 to 100,000.

The electromagnetic wave shielding layer preferably has a thickness of 0.01 to 2 mm, more preferably 0.015 to 1 mm, further preferably 0.02 to 0.5 mm, especially preferably 0.025 to 0.25 mm. When the thickness of the electromagnetic wave shielding layer is too small, there is a concern that the shielding performance becomes poor, and, conversely, when the thickness of the electromagnetic wave shielding layer is too large, the whole diameter of the sensor member is increased, and therefore the flexing properties and flexing durability disadvantageously tend to become poor.

The sensor member can have a structure such that two or a plurality of sensor bodies are twisted together or braided so that the sensor bodies mutually offset an extraneous noise (a cable having such a structure is generally referred to as "twisted pair cable"), causing the sensor bodies to function as mutual electromagnetic wave shielding layers.

When the measurement specimen well satisfies the function of the electromagnetic wave shielding layer, the measurement specimen per se may be regarded as an electromagnetic wave shielding layer by, for example, employing a method of embedding or covering the sensor body in the measurement specimen.

It is preferred that the electromagnetic wave shielding layer is disposed on the outside of the sensor body (outside as viewed in the diameter direction) through an insulating layer.

The insulating layer preferably has a specific resistance in the range of from $1\times10^{10}$ to $1\times10^{22}$ (Ω·m), more preferably $1\times10^{12}$ to $1\times10^{19}$ (Ω·m), further preferably $1\times10^{14}$ to $1\times10^{18}$ (Ω·m).

The insulating layer may be, for example, a layer obtained by coating the conductor per se with an insulator like an enameled wire, or a layer obtained by filling or coating a space between the conductor and the electromagnetic wave shielding layer with an insulator. Specifically, the enamel layer is preferably a material selected from at least one of rubbers and resins, such as a synthetic rubber, a thermoplastic elastomer, a polyimide, an epoxy, a silicone cross linked rubber (preferably which is improved in heat resistance or elastic deformability by a secondary crosslinking treatment), a polyurethane, ethylene tetrafluoride, ethylene trifluoride, an epoxy resin, a phenolic resin, a polyamide resin (including an aromatic polyamide resin), a polyether amide resin, a polysulfone resin, a hard silicone resin, and an urethane resin. By coating the conductor with the above rubber or resin, an insulating layer can be formed.

The thickness of the insulating layer varies depending on the material for the insulating layer, but is preferably 0.01 to 3 mm, more preferably 0.05 to 2 mm, further preferably 0.1 to 1 mm, especially preferably 0.2 to 0.5 mm. When the thickness of the insulating layer is too small, the electrical insulation function disadvantageously becomes unstable, and conversely, when the thickness of the insulating layer is too large, the sensor member disadvantageously tends to be poor in the flexing properties or flexing durability.

Examples of coating methods for the insulating layer include a dip coating method in which the conductor is dipped in a layer having a resin dissolved in a solvent, and a melt coating method in which the conductor is passed through a pore filled with a molten resin.

The insulating layer may be a layer obtained by winding an electrically insulating fiber or film, instead of using the above-mentioned methods. Specifically, the insulating layer can be formed by winding an electrically insulating fiber or film round the outer surface of the conductor using a covering machine or the like. As specific examples, an aramid fiber having high heat resistance and insulation properties (such as Technora and Twaron), a glass fiber, and the like are preferred.

A protective layer may be further formed on the outside of the electromagnetic wave shielding layer. The protective layer preferably has a thickness of 0.01 to 3 mm, more preferably 0.05 to 2 mm, further preferably 0.1 to 1 mm, especially preferably 0.2 to 0.5 mm. It is preferred that the protective layer is a fiber, a resin, or the like for protecting the electromagnetic wave shielding layer from an external stimulus, such as a flaw or fraying. In the protective layer, the same materials and processing method as those used for the insulating layer may be used. When the protective layer has electrical insulation properties, the protective layer contributes to the effect of prevention of a current flowing into the electromagnetic wave shielding layer directly from the outside, such as static electricity, the improvement of frictional resistance, the improvement of water resistance, or the increase of adhesive force for improving fixation to the surroundings. When the protective layer is intended to prevent an external stimulus, or improve the frictional resistance, or the like, the protective layer may be formed only on part of the electromagnetic wave shielding layer.

The length of the sensor member in the invention may be appropriately set according to the application of the measurement and the object to be measured, and the sensor member may be disposed over the whole length of the measurement specimen as an object to be measured, or may be disposed only on part of the length of the specimen. Further, the sensor members may be disposed on a plurality of positions of the measurement specimen. Further, the sensor members may be disposed only on an arbitrary part of the measurement specimen.

In the case where a plurality of sensor members are disposed on the measurement specimen, the fail-safe properties are improved so that even when some of the sensor members are deactivated due to a failure, breaking, or the like, the measurement can be continued by at least one sensor member which remains intact.

The sensor members may have substantially the same length, or at least part of or all of the sensor members may have different lengths. When the sensor members having the same length are disposed on the specimen, a plurality of measured data can be obtained, and therefore the measurement precision is improved. When the sensor members having different lengths are disposed on the specimen, an elongation amount and/or an elongation ratio in an arbitrary section of the measurement specimen can be measured from the measured data of two or more arbitrary sensor members using the below-mentioned measuring means.

Further, a plurality of sensor members may have different physical properties. Specifically, for example, a plurality of sensor members may be disposed on the measurement specimen so that a specific sensor member among the sensor members has a breaking strength and an elongation at break of the core material, which are relatively lower than those of the other sensor members, enabling stepwise detection of a load on the measurement specimen.

The sensor member may be disposed in a linear form on the measurement specimen, or may be disposed in the state of being two-dimensionally or three-dimensionally bent on the measurement specimen. Further, for example, the sensor member may be disposed in a U-shaped arrangement, in other words, the sensor member may be arranged on the measurement specimen so that both ends of the sensor member are disposed on one end side of the measurement specimen and the sensor member is folded at the center portion thereof on another end side of the measurement specimen, or, as shown in FIG. 7, two sensor members may be arranged on the measurement specimen so that a conductor (terminal for measurement) is led from one end side of the sensor members and connected to a conductor (terminal for measurement) on another end side. By employing such a U-shaped arrangement, the conductors present at both ends of the sensor member or members can be gathered at a single site of the measurement specimen, making it possible to simplify the wiring.

At least two sensor members or a plurality of sensor members may be arranged in substantially parallel. The expression "substantially parallel" includes the case where the sensor members are geometrically arranged in parallel, and the case where the sensor members are twisted together (for example, a double helix structure). That is, the expression "substantially parallel" indicates arrangement conditions such that the distance between the sensor members in the lengthwise direction of the sensor members is substantially the same.

That is, by arranging two or more sensor members having different lengths in substantially parallel, an improvement of the measurement precision and measurement of an elongation amount and/or an elongation ratio in an arbitrary section can be achieved. Further, by employing the above-mentioned construction and disposing the sensor members, for example, in a U-shaped arrangement so that both ends of the sensor members are disposed on one end side of or a specific part of the measurement specimen, there can be provided the sensor member that makes it possible to simplify the wiring. A plurality of sets of the sensor members having different lengths may be arranged as shown in FIG. 7.

It is preferred that the elongation ratio (displacement ratio) of the sensor member is consistent with or substantially consistent with the elongation ratio of the measurement specimen. It is further preferred that the main materials for the core in the sensor member are the same as the main materials for the measurement specimen. When the elongation ratio of the sensor member is substantially consistent with the elongation ratio of the measurement specimen, the sensor precision can be improved, and further an excess load on the sensor member can be suppressed.

The sensor member is fixed to the whole of or part of the inside or surface of the measurement specimen. The sensor member can be fixed to the inside by using a means of incorporation, embedding, or the like. The sensor member can be fixed to the surface by using a means of adhesion, fastening using a fitment or the like, or the like. For example, when the measurement specimen is a fiber, the sensor member may be fixed to the fiber by a method in which the sensor member and the fiber are twisted together and fixed by the compression force and frictional force generated due to torsion caused by twisting, or a method in which the sensor member and the fiber are immersed in a molten resin and then the resin is solidified.

For further increasing the fixing force, an adhesive resin layer having an adhesive function may be formed in the interface between the sensor member and the measurement specimen. The adhesive resin layer is not strictly limited, but is preferably selected taking into consideration the heat resistance temperature of the core, resin, or the like contained in the sensor member, and various types of thermosetting resins, thermoplastic resins, aromatic polyamide resins, and the like can be used. By using such a resin, the resin is cured, softened, molten, mutually dissolved, or the like upon heating, facilitating adhesion or fusing at the interface. Specifically, when the measurement specimen is a fiber, such as a cable, there can be mentioned a method in which before incorporation, the uppermost surface layer of the sensor member or the fiber as the measurement specimen is preliminarily coated with an adhesive resin, and a method in which after incorporation, an adhesive resin is injected from the outside into the sensor member and the fiber, or the sensor member and the fiber are impregnated with an adhesive resin from the outside.

Examples of thermosetting resins include polyurethane, unsaturated polyester, vinyl ester, acrylic, phenolic, epoxy, and silicone resins, and examples of thermoplastic resins include polyethylene, polypropylene, nylon, polycarbonate, polyether sulfone, and modified resins thereof.

Further, one sensor member or a plurality of sensor members may be arranged. When a plurality of sensor members are used, the sensor members may be randomly arranged or may be arranged in parallel. When the sensor members are arranged in parallel, a plurality of channels at points of measurement can be selected, and a channel can be arbitrarily selected if necessary. Further, the circuits in the sensor arranged in parallel enable equalization of inductance values and the like, which are the measured values, so that the stability of data is improved, making it possible to operate the unified roundtrip circuits for going/returning electric signal, and the like. Thus, by virtue of the structure in which a plurality of the elongation sensors in the invention are arranged in parallel to each other, it is possible to improve the reliability of the measurement.

The sensor device of the invention using the sensor member and the method for measuring an elongation amount and/or an elongation ratio are described below.

The sensor device of the invention preferably has a measuring means for detecting an electric signal from the coiled conductor in the sensor member to measure an elongation of the measurement specimen based on a change of the electric signal. The measuring means may be integrally incorporated into the sensor member, or may be separate from the sensor member. Further, it is preferred that the measuring means has a detector for detecting an electric signal change, which is electrically connected to the conductor of the sensor member, and an arithmetic part for conducting a calculation of an elongation amount and/or an elongation ratio of a measurement specimen based on a change of the electric signal. Particularly, it is preferred that the electric signal change is an inductance change. The reason for this is that the inductance change of the conductor and the elongation amount of the sensor member have stable linearity, making it possible to improve the measurement precision. In the simplest system, there is only a need to measure whether the measurement specimen has an elongation or not, but it is preferred that an elongation amount and/or an elongation ratio is measured. The elongation amount and elongation ratio are referred to also as "elongation ratio", "elongation ratio", "elongation degree", or "elongation displacement".

The relationship between an elongation of the coiled conductor and a reduction of the inductance is explained below. In the explanation, as shown in FIG. 2, the initial coil length is taken as D (m), a current is taken as I (A), a coil sectional area is taken as S (m$^2$), the total number of winding is taken as N, and the number of winding per unit length is taken as n=N/D.

When the permeability of the coil is taken as μ (N/A$^2$), the self-inductance L(H) of the coil is represented by the following:

$$L=\mu N^2 S/D$$

Using a current I, the magnetic field H (N/Wb) inside the coil is represented by the following:

$$H=nI$$

The magnetic flux density B (Wb/m$^2$) inside the coil is represented by the following:

$$B=\mu H=\mu n I$$

The magnetic flux $\Phi_0$ (Wb) penetrating the coil sectional area S (m$^2$) is represented by the following:

$$\Phi_0 = B \cdot S = \mu n I S$$

In the coil having a length D and the total number of winding N, the magnetic flux $\Phi_0$ crosses the coil having the total number of winding N, and therefore there is the following relationship:

$$\Phi = N \cdot \Phi_0 = N \cdot \mu n I S = N \cdot \mu (N/D) I S = \mu N^2 S I/D$$

When the self-inductance of the coil before elongation is taken as L (H), the initial coil length before elongation is taken as D, and the initial sectional area is taken as S, L is represented by the following:

$$L = \Phi/I = \mu N^2 S/D$$

On the other hand, when the self-inductance of the coil elongated at an elongation ratio e is taken as L' (H) and the sectional area is taken as S', the coil length is represented by eD, and L' is represented by the following:

$$L' = \mu N^2 S'/eD$$

From the above formulae for the self-inductance, the following relationship is introduced:

$$L/L' = e(S/S')$$

and it is found that the elongation ratio e of the coil is represented by the following:

$$e = (L/L') \cdot (S'/S)$$

Accordingly, when a value of L/L' and a value of S'/S are determined, the elongation ratio e of the coil can be determined. The value of S'/S is a variable in accordance with the coil elongation, but, in the coil having a uniform pitch, the value determined from the initial shape of the coil (the diameter of the coil, the thickness and width of the conductor, and the designed value of the number of winding per unit length) by geometrical calculation can be used as a substitute for S'/S, and therefore there is no need to actually measure a value of S'/S.

This is the principle of elongation ratio measurement by the sensor member using the inductance change of the sensor member in the sensor device of the invention, and, by conducting a calculation of the correlation between the inductance change detected by the detector and the elongation ratio in the lengthwise direction of the coiled conductor using the arithmetic part, an elongation amount and an elongation ratio (a displacement amount and a displacement ratio) of the sensor member can be determined.

In the measurement of an inductance of the sensor member, the phase angle θ of the impedance is preferably in the range of from about 3 to 90°, more preferably in the range of from 10 to 90°, most preferably in the range of from 20 to 90°. When the phase angle θ of the impedance is in the above-mentioned range, the measurement can be conducted at high sensitivity with high precision.

Further, for example, depending on the material for the measurement specimen or the method used, the elongation ratios in the sections (arbitrary sections) of the measurement specimen may be different. In such a case, by using a plurality of sensor members having different lengths, an elongation amount and an elongation ratio (a displacement amount and a displacement ratio) can be measured with ease and with high precision.

Specifically, for example, as diagrammatically shown in FIG. 7, on a measurement specimen (wherein the measurement specimen has sections a, b, c having different elongation ratios), sensor members S1, S2, S3 having different lengths are disposed. The initial lengths of the sections a, b, c of the measurement specimen are taken as La, Lb, Lc, respectively, the lengths after elongation are taken as La', Lb', Lc', Lc", and the elongation ratios are taken as ea', eb', ec', ec". The initial lengths of the sensor members S1, S2, S3 are taken as LS1, LS2, LS3, respectively, and the elongation ratios determined by the actually measured value of inductance are taken as e1', e2', e3', e3". The sensor members are fixed to the measurement specimen so that the elongation ratios of the respective sections of the measurement specimen are equivalent to the elongation ratios of the sensor members arranged in the respective sections. The initial values La, Lb, Lc, LS1, LS2, LS3 are measured and known values, and e1', e2', e3', e3" are values obtained by the measurement as mentioned above.

The elongation ratio ea' of the sensor member in the section a is equal to the value of e1' determined by the actual measurement, that is, ea'=e1'.

Using the values of e1' and e2' determined by the actual measurement, an elongation ratio eb' of the sensor member in the section a is determined. The length after elongation of the sensor member S2 in the section b is as follows: (LS2×e2')−La'=(LS2×e2')−(La×e1'), and this is divided by the initial length (LS2−La) of the sensor member S2 in the section b, and, as a result, an elongation ratio eb' of the sensor member in the section b is determined as follows: eb'=((LS2×e2')−(La×e1'))/(LS2−La).

Using the values of e1' and e3' determined by the actual measurement and the value of eb' determined as mentioned above, an elongation ratio ec' of the sensor member in the section c is determined. The length after elongation of the sensor member S3 in the section c is as follows: (LS3×e3')−La'−Lb'=(LS3×e3')−(La×e1')−(Lb×eb'), and this is divided by the initial length (LS3−La−Lb) of the sensor member S3 in the section c, and, as a result, an elongation ratio ec' of the sensor member in the section b is determined as follows: ec'=((LS3×e3')−(La×e1')−(Lb×eb'))/(LS3−La−Lb).

In the case where the sections a, b have no elongation and only the section c has an elongation, an elongation ratio ec" of the sensor member in the section c is represented by the above formula wherein each of e1' and eb' is 1, namely, represented by: ec"=((LS3×e3")−La−Lb)/(LS3−La−Lb).

Specifically, as shown in FIG. 7, at least two or more sensor members having different lengths are disposed on the measurement specimen so that one end side of the sensors is present on one end side of the measurement specimen and the sensor members are arranged in substantially parallel. Conductors (terminals for measurement) are led from one end side and another end side of the sensor members, and an elongation amount and/or an elongation ratio of the measurement specimen is measured based on an inductance change. As shown in the middle diagram (complete elongation) of FIG. 7, a conductor (terminal for measurement) may be led from each end, or, as diagrammatically shown in the lower diagram (partial elongation) of FIG. 7, conductors may be led from the sensor members such that pairs of two sensor members having different lengths are disposed, and conductors (terminals for measurement) are led from one end side of the sensor members, and conductors (terminals for measurement) on another end side are connected to each other, so that the two sensor members are arranged in a going and returning manner (disposed in a U-shaped arrangement) on the measurement specimen, gathering the wiring of the sensor members for measurement at a single site.

When the wiring is handled outside of the sensor members as seen in the sensor members shown in the middle diagram (complete elongation) of FIG. 7, it is preferred that the outside wiring has a shield for preventing a noise. When two sensor members are arranged in a going and returning manner (disposed in a U-shaped arrangement) on the measurement specimen, the lengths and the like of the sensor members used in the above-mentioned formulae for calculation may be appropriately corrected.

Then, using a difference between the elongation amounts of two or more arbitrary sensor members, an elongation amount in an uncommon section in which the two arbitrary sensor members do not overlap is determined, making it possible to measure an elongation amount and/or an elongation ratio of the measurement specimen in arbitrary sections (sections a, b, c in FIG. 7).

In the measurement made as mentioned above, even when, for example, as shown in the lower diagram of FIG. 7, the measurement specimen is completely elongated, or only part of the measurement specimen (section c in FIG. 7) is elongated, an elongation ratio (elongation ratio) in each section can be measured. When only part of the measurement specimen is elongated, the sensor member of which the elongation is not measured may be set to be out of an object of the calculation by the arithmetic part.

The above-mentioned method for measuring an elongation of the sensor member is particularly effective under conditions such that handling the sensor member as a lumped parameter circuit is preferred, in the case where the length of the conductor in the sensor member is relatively small (the case where the length of the conductor is generally more than ¼ of the wavelength of the alternating current used in the measurement). Further, under the above conditions, not only from a change of the inductance, but also from a change of the capacitance, resistance, alternating current impedance, resonant frequency, Q value, or the like, information concerning deformation of the sensor device can be obtained.

On the other hand, in the case where the length of the conductor in the present sensor member is relatively large (the case where the length of the conductor is generally ¼ or less of the wavelength of the alternating current used in the measurement), under conditions such that handling the sensor member as a distributed parameter circuit is preferred, the state of deformation of the sensor can be sensed using a method for transmission line analysis. For example, by measuring a characteristic impedance, phase lag due to transmission, or a change of the transmission attenuation, a change of the electrical parameter of the sensor can be grasped. Further, using a TDR (Time Domain Reflectance) method, an abnormal site in which an uneven change of the impedance is locally caused can be specified, or the occurrence of burnout or the like can be sensed.

The detector in the sensor device of the invention is an apparatus having an electric processing circuit for measuring a change of the electrical parameter of the conductor, and a commercially available electronic instrument may be used, or an electric circuit may be discretely designed and used in the measurement.

Preferred examples of commercially available electronic instruments include an impedance analyzer, an LCR meter, a network analyzer (an apparatus manufacturer of which is Keysight Technologies, Inc., Hioki E. E. Corporation, or the like), a TDR cable testing measurement apparatus (an apparatus manufacturer of which is Bi Communications Ltd. or the like), and an oscilloscope which can measure phase lag or an attenuation with respect to the alternating current signal as a base (manufactured by Keysight Technologies, Inc., or the like), and, if necessary, these are used in combination.

When handled as a lumped parameter circuit, it is preferred that the detector is electrically connected to both ends of the conductor in the sensor member, and the electromagnetic wave shielding layer is connected to the terminal for ground potential of the detector or the terminal for shield line. In this instance, the detector may be separate from the sensor device, or may be unified with the sensor device. With respect to the wiring connection method for the detector and the sensor device, the use of a known measurement method, such as a two-terminal method, a four-terminal method, or a five-terminal method, is preferred, and further preferred is a four-terminal method or five-terminal method based on a conventional method.

Further, when handled as a distributed parameter circuit, it is preferred that measurement is conducted, for example, in the state in which, at one end of the sensor member, the conductor and the electromagnetic wave shielding layer are connected to the terminals (two terminals) of the detector and, at another end of the sensor member, the conductor and the electromagnetic wave shielding layer are electrically opened.

From the information of the change of electrical parameters including an inductance obtained by the above measurement method, the state of deformation of the sensor member can be easily calculated by calculation, based on the above-mentioned principle and the like. Further, the obtained electrical parameter change data and the deformation data of the sensor device calculated by calculation may be transmitted through a wire or by wireless or the like if necessary, and can be utilized for a monitoring or controlling purpose in various applications.

The measuring means in the sensor device of the invention may have a judgment means for judging an abnormal state of the sensor member. For example, when an unusual increase of the direct current resistance of the conductor in the sensor member, short-circuiting, or the like is sensed, or when a very large reflected signal is obtained in a transmission line analysis, the occurrence of a fracture or partial fracture of the sensor device due to application of a large external force, repeated fatigue, or the like can be judged to be an abnormal state.

The invention is a sensor device which has a sensor member having a core using a core material having low plastic deformability, a conductor that is wound round the outer surface portion of the core in a coil form, and an electromagnetic wave shielding layer for protecting the conductor from an electromagnetic wave, and which can measure an elongation amount and/or an elongation ratio of a measurement specimen by conducting a calculation of a winding pitch elongation of the conductor (displacement of the number of winding per predetermined length) based on a change of the detected electric signal from the sensor member, and the sensor device has excellent repeatability in the measurement and excellent reliability with time.

Particularly, the sensor device of the invention can be applied to the measurement of an elongation or compression (including elongation or compression caused due to flexural deformation) of a string or fiber member, such as a rope, a sling, a fishing net, a cable brace for construction, or an elevator cable, a power cable, a communication cable, a flexible pipe for fuel (liquid fuel or gaseous fuel) transfer, a resin molded part, a rubber molded part, an inorganic molded part, or a resin fiber composite material. Further, the sensor device can measure a change of the gap dimension in a structure or a connector portion. Examples of applications include various transport tools, such as an aircraft, a vessel (including one which travels below the surface of the sea), and a vehicle, a building structure (a beam material and a wall surface), a road, and a bridge. Further, the present sensor member has high precision, and can be designed in shape according to the application and thus can be advantageously incorporated or mixed into various types of measurement specimens, and has so high resistance to the repeated use that the sensor member can be used even in a severe outdoor environment (in the sea, on the seashore, exposure to the weather, high temperatures, or sunlight, or the like).

Further, the invention is a method for measuring an elongation amount and/or an elongation ratio using the sensor device, wherein the method can measure an elongation amount and/or an elongation ratio, for example, an elongation displacement amount/rate of the measurement specimen with no destruction in real time with high reliability, and takes data of an elongation amount and/or elongation ratio or an abnormal state (such as breaking, fracture, or failure) of the measurement specimen with high precision all the time.

EXAMPLES

Hereinbelow, the present invention will be described in more detail with reference to the following Examples, which should not be construed as limiting the scope of the invention. In the following Examples, the measurements were determined by the methods described below.
(1) Preparation of a test specimen for residual strain test and creep test of a core material As shown in FIG. 3, a test material 7 (in the present Examples, only a fiber is used as a test material 7 and hence, hereinafter, the test material 7 is referred to as "fiber", but a test material 7 in another form, such as a film, can be similarly subjected to test) was aligned in a non-twisted state, and an appropriate amount of a cyanoacrylate instant adhesive 8 (Aron Alpha Professional No. 1, low-viscosity high-speed type, manufactured by Konishi Co., Ltd.) was permitted to penetrate the fiber, and solidified in a state such that the resultant fiber was sandwiched between two pieces of paper 30 mm square cut out from Kent paper 6 having a thickness of 1 mm (commercially available product), fixing the fiber to the Kent paper 6. Subsequently, a fiber was similarly fixed to Kent paper 6 at a position away from the above fixed position with a gap of 150 mm, preparing a test specimen for residual strain test and creep test in which the distance between the fixed positions was 150 mm.

When the adhesion of a fiber is unsatisfactory, sliding of the fiber (which is observed also as acute inflection in the load/strain curve) may be generated during a tensile test (upon application of load), and, when sliding of the fiber is presumed to be generated, the test result is deleted and a test is further conducted using another test specimen.
(2) Tensile Test and Measurement of Residual Strain of a Core Material With respect to the test specimens to be subjected to the 60° C. measurement below, each test specimen was preliminarily subjected to pretreatment for removing the influence of thermal dimensional shrinkage of the core material such that the test specimen was allowed to stand under no tension in a dry environment at a humidity of 20% or less at 60° C. for 2 hours, and the resultant test specimen was used in the measurement. In this pretreatment, using these test specimens, a thermal shrinkage rate of the core material in the lengthwise direction is also measured.

The 25° C. measurement was conducted as follows. In a test chamber controlled to be 25° C., using the above-mentioned test specimen, and using a tensile tester, manufactured by Instron Corporation, a tensile test was conducted under conditions such that the initial gap between the chucks was 150 mm, the elongation speed upon application of load was 3 mm/minute, and the elongation speed upon removal of load was 3 mm/minute. The initial load upon application of load corresponded to 0.1% of the test specimen breaking strength at 25° C., and the value of strain at that time was taken as an initial strain (strain is zero). The tensile strength and elongation of the test specimen were measured in such a way that an elongation was given until breaking of the test specimen.

A tensile modulus of the test specimen was determined as follows. Using a load corresponding to 75% of the tensile strength of the test specimen as a maximum load, a test was conducted according to: A: first load: application of load from the initial load point until the maximum elongation ratio; B: first removal of load: removal of load until the initial load point; C: load is maintained at the initial load point for 30 seconds; D: second load: application of load until the maximum elongation ratio; and E: removal (release) of load, and a tensile modulus was determined from the slope of the tangent line at the load point corresponding to 10% of the maximum load in the load/elongation curve upon the second application of load.

A residual strain of the test specimen was determined as follows. In accordance with the procedure shown in the FIG. 4, a tensile test was conducted in a cycle of: A: first load: application of load from the initial load point until the maximum elongation ratio; B: first removal of load: removal of load until the initial load point; C: load is maintained at the initial load point for 30 seconds; D: second load: application of load until the maximum elongation ratio; and E: removal (release) of load, and a residual strain was determined from an elongation ratio under a load corresponding to 1% of the maximum load in the load/elongation curve upon the second application of load (wherein the elongation ratio is a value obtained by dividing the elongation from the initial load point by the length of the gap between the chucks at the initial load point).

With respect to the maximum elongation ratio, in the gap between the chucks at the initial load point, three conditions of 2% elongation, 3% elongation, and 4% elongation were set.

Further, the 60° C. measurement was conducted as follows. Using a thermostatic chamber attachment of a tensile tester, the temperature in the thermostatic chamber was increased to 60° C., and the temperature in the chamber was satisfactorily stabilized and then, an initial load corresponding to 0.1% of the test specimen breaking strength at 60° C. was applied, and then the measurement was conducted in accordance with the same procedure as in the 25° C. measurement.

Each test is conducted with respect to 5 test specimens, and an average of the measured values is used as a residual strain of the test specimens. When the maximum and the minimum of the measured values of the 5 test specimens are not within ±20% in respect of the average (or when the dispersion is extremely large), such an error is considered to be derived from the preparation of the test specimens, and the measurement is further conducted using 5 test specimens separately prepared.

(3) Tensile Creep Test of a Core Material and Calculation of a Creep Rate

The 25° C. measurement was conducted as follows. In a test chamber controlled to be 25° C., using the above-mentioned test specimen, and using a tensile tester, manufactured by Instron Corporation, a test was conducted under conditions such that the initial gap between the chucks was 150 mm. The initial load corresponded to 0.1% of the test specimen breaking strength at 25° C., and the value of strain upon application of the initial load was taken as an initial strain. The test load for creep test corresponded to 30% of the test specimen breaking load at 25° C., and, after the load reached the creep test load from the initial load, the load was continuously applied for 240 minutes, and an increase of strain of the test specimen (creep phenomenon) was measured. When breaking of the fiber is seen during the test, the test is terminated at that time point. Stretching of the test specimen until the load reached the creep test load was made at a pulling rate of 10 mm/minute.

Further, the 60° C. measurement was conducted as follows. Using a thermostatic chamber attachment of a tensile tester, the temperature in the thermostatic chamber was increased to 60° C., and the temperature in the chamber was satisfactorily stabilized and then, an initial load corresponding to 0.1% of the test specimen breaking strength at 60° C. was applied, and the value of strain at that time was taken as an initial strain. The test load for creep test corresponded to 30% of the test specimen breaking load at 60° C., and, after the load reached the creep test load from the initial load, the load was continuously applied for 240 minutes, and an increase of strain of the test specimen (creep phenomenon) was measured. When breaking of the fiber is seen during the test, the test is terminated at that time point. Stretching of the test specimen until the load reached the creep test load was made at a pulling rate of 10 mm/minute.

A creep rate (%/minute) was determined by dividing a difference (%) between the strain (%) 10 minutes after the load reached the test load and the strain (%) 240 minutes after the load reached the test load by 230 (minutes).

The creep test is conducted with respect to 5 test specimens, and an average of the obtained test values is used as a measured value. When the maximum and the minimum of the 5 measured values are not within ±20% in respect of the average, the measurement is further conducted using 5 test specimens separately prepared.

(4) Evaluation of the Frictional Force (Sliding Ability) Between the Core and the Conductor in the Sensor Body The sensor body having a conductor wound round a core was cut into a 300 mm length, and the wound conductor was removed, except for the end of the sensor body having a length of 40 mm, to prepare a test specimen. That is, this test specimen has one end having a length of 260 mm in which the conductor is not wound, and another end having a length of 40 mm in which the conductor is wound.

Then, in accordance with the same procedure as in the item (1) above, a part of one end of the test specimen was fixed between two pieces of Kent paper using an instant adhesive, and then fixed to one chuck of a tensile tester (manufactured by Instron Corporation). The whole length of another end of the specimen in which the conductor is wound is fixed to another chuck. Another end of the specimen is fixed through a cushioning material (such as a rubber sheet) for filling the gap upon chuck clamping to enable stable fixing with chucks.

A tensile test for the test specimen was conducted under conditions such that the gap between the chucks was 200 mm and the elongation speed was 2 mm/minute. In the load/elongation curve upon application of load in the present tensile test, a point of inflection (point of sliding generation) is observed in which the elongation is temporarily increased due to the generation of sliding between the core and the conductor. With respect to the proportion of the value of load at which the test specimen exhibits a point of inflection (in the case where there are a plurality of points of inflection, the value of load for the first point of inflection) to the value of load required for 2% elongation of the sensor body before the test specimen processing, evaluation is made as follows: the proportion is less than 1%: x; 1 to less than 2%: ∆; 2 to less than 3%: ○; and 3% or more: ⊙. The test is conducted with respect to 10 test specimens, and an average of the obtained test values is used as a measured value. When the maximum and the minimum of the 10 measured values are not within ±33% in respect of the average, the measurement is further conducted using 10 test specimens separately prepared.

(5) Repeated Tensile Test of a Sensor Device and Evaluation of the Error of Measurement The 25° C. measurement was conducted as follows. In a test chamber controlled to be 25° C., a test was conducted. Using a tensile tester, manufactured by Instron Corporation, the clamping force of the chucks is controlled so that a tensile test can be made without causing the sensor member to slide. In the case of the test specimen in which the electromagnetic wave shielding layer is exposed to the surface of the sensor member, it is preferred that a PET film having a thickness of 0.13 mm is placed between the test specimen and the chuck to make electrical insulation between the electromagnetic wave shielding layer and the chuck. On the other hand, in the case of the test specimen in which the surface of the sensor member is coated with an insulating layer and hence the electromagnetic wave shielding layer is not exposed, it is not always necessary to place a PET film between the test specimen and the chuck, and, for the purpose of surely clamping the test specimen by the chuck, if necessary, using a chuck having the surface unevenly textured, the clamping stress is preferably locally concentrated.

As shown in FIG. 5, a sensor member 11 having a whole length of 1,200 mm was provided, and part of the middle portion of the sensor member 11 was firmly fixed by chucks 12 with a gap of 150 mm. On the other hand, both ends of the sensor member 11 having a length of 1,200 mm were connected to a commercially available LCR meter 9 (manufactured by Keysight Technologies, Inc.) having an exclusive test fixture 10 connected thereto. With respect to the connection of the sensor member 11, the sensor body was connected to a terminal for device measurement of the test fixture box, and the electromagnetic wave shielding layer was connected to a shield line of the test fixture 10. This connection has a state such that the electromagnetic wave shielding layer forms an electrically closed circuit through the shield line (also called guard line) of the test fixture 10. Further, the shield line of the test fixture 10 is connected to a ground potential, and accordingly the electromagnetic wave shielding layer is also connected to a ground potential (a detailed connection was not shown in the diagrammatic view). That is, the test portion to which a tensile load is applied has a sensor member length of 150 mm, and the non-test portion to which a load is not applied has a sensor member length of 1,050 mm. Then, an inductance of the sensor member 11 was measured at a frequency of 1 MHz by means of the LCR meter 9.

A tensile test for the middle portion of the sensor member having a length of 150 mm was conducted at an elongation speed of 3 mm/minute in a way such that a cycle of application and removal of load was repeated five times. With respect to the maximum elongation ratio, three conditions of 2% elongation (+3 mm), 3% elongation (+4.5 mm), and 4% elongation (+6 mm) were set.

Using a thermostatic chamber attachment of a tensile tester, the temperature in the thermostatic chamber was stabilized and then, the 60° C. measurement was conducted in accordance with the same procedure as in the 25° C. measurement.

a) Elongation ratio based on the indicated value of a tensile tester: An elongation ratio was determined by dividing the indicated value of a tester (150 mm+a) at each point of measurement in the elongation test by the initial length (150 mm) before the elongation test. The value was rounded to three decimals. The thus determined value is taken as E value. The E value means an elongation ratio of the sensor member as a measurement specimen to be measured. In the present Examples, an elongation ratio with the distance between the chucks is to be measured, but an elongation ratio of an object to be measured is measured in an actual use.

b) Elongation ratio of a sensor member calculated from an inductance: From the formula: Inductance of the whole length of the sensor member before the elongation test×1,050 (mm)/1,200 (mm), an inductance of the non-test portion is determined by calculation, and the determined value is subtracted from an inductance at each point of measurement in the elongation test to determine an inductance of the test portion. Then, with respect to the inductance of the test portion, a value was determined at each point of measurement by dividing an initial inductance (L) before the elongation test by an inductance (L') after the elongation test, and rounded to three decimals. The thus determined value is taken as A value.

According to the above-mentioned self-inductance relationship of the coil, in an ideal sensor device having no error, an ideal value of A value is obtained, and the following relationship is satisfied: E value=A value×Coil sectional area ratio (Sectional area S' at point of measurement/Initial sectional area S before elongation), but, for evaluating the error of the actual measurement, the following value was obtained: A value×Coil sectional area ratio (Sectional area S' at point of measurement after the elongation test/Initial sectional area S before the elongation test)=e value, and, as the difference (absolute value) between the e value (actually measured value) and the E value (ideal value) was close to zero, the error of measurement was reduced, and, as the difference was increased, the error of measurement was increased. With respect to the coil sectional area ratio, a value obtained by making a theoretical calculation from the diameter and the number of winding per unit length of the coil before the elongation test, the thickness and width of the conductor, and the coil elongation ratio at each point of measurement is used. FIG. 6 diagrammatically showed an example of the relationship between the E value and e value in an ideal sensor device having no error, and the relationship between the E value and e value in a sensor device having an error.

In the evaluation of the error of measurement, with respect to the measured data in which the E value obtained at the fifth cycle (upon application of load and removal of load) in the elongation test is in the range of from 0.002 to 1.04, the maximum value of a difference (absolute value) between the E value and the e value was determined, and an evaluation was made as follows: the smaller the maximum value, the smaller the error of measurement for the sensor member (the more excellent the performance). The present test was conducted with respect to 5 test specimens, and an average of the measured values was determined. When a difference between the maximum and the minimum of the measured values is ±20% or more of the average, the test specimen is judged to probably have a failure, and a test is further conducted using 5 test specimens separately prepared.

(6) Evaluation of Creep Durability of a Sensor Device

The sensor member was arranged as in the repeated tensile test of the item (5) above, and maintained under the load at 1.5% elongation in an environment at 60° C. for 240 minutes (creep test), and, after removal of the load, the resultant sensor member was subjected to the repeated tensile test of the item (5) above, evaluating an error of measurement.

Example 1

(Preparation of a Sensor Member)

As a core, a copolymerized aromatic polyamide fiber yarn having a fineness of 440 dtex (copolyparaphenylene-3,4'-oxydiphenylene.terephthalamide fiber yarn, "Technora", manufactured by Teijin Limited; the number of fibers constituting the continuous fiber filament: 267; approximate diameter of the fiber bundle: about 0.21 mm; relative permeability: 1.0) was used.

As a conductor, a silver-plated rolled copper foil having a thickness of about 0.025 mm and a width of about 0.3 mm was used. This conductor had an electrical resistance of about 2.4 Ω/m.

Using the fiber yarn as a core, and using a covering machine, the silver-plated rolled copper foil wire was wound under conditions such that the number of winding was about 2,700 T/m, obtaining a sensor body. The fiber yarn was not subjected to twisting, and the take-up bobbin used in spinning was set as such to the covering machine. The obtained sensor body had an average diameter of about 0.3 mm, the copper foil wire was spirally wound round the outer surface of the core at an almost uniform pitch, and the gap in the wound copper foil wires was about 0.07 mm on average.

For checking the twisted state of the fiber after wound, a sensor body was prepared and then the wound conductor was peeled off in a state that the sensor body was under a tension, and a twist pitch (turns/m) of the core fiber was measured, and, as a result, it was found that the twist was about 130 T/m (twist multiplier: 0.82).

Then, the obtained sensor body was used as a center axis, and the surface of the sensor body was subjected to extrusion coating with an olefin thermoplastic elastomer in a molten state from a dice of a melt-extruder, forming a coating of an insulating layer having a thickness of 0.25 mm on the outer surface of the sensor body. Further, an electromagnetic wave shielding layer was formed on the outer surface of the insulating layer in accordance with the following procedure.

First, a nickel-plated rolled copper foil having a thickness of about 0.025 mm and a width of about 0.3 mm was wound round a copolymerized aromatic polyamide fiber yarn having a fineness of 110 dtex (copolyparaphenylene-3,4'-oxy-diphenylene.terephthalamide fiber yarn, "Technora", manufactured by Teijin Limited; the number of fibers constituting the continuous fiber filament: 48; approximate diameter of the fiber bundle: about 0.1 mm) using a covering machine under conditions such that the number of winding was about 3,000 turns/m, preparing a conductive wire having a fiber as a core. The nickel plating is effective in preventing the copper foil from rusting, and intended to stabilize the conductive properties (resistance) of the electromagnetic wave shielding layer for a long term.

Using the 32 conductive wires, and using a braiding machine, an electromagnetic wave shielding layer having the conductive wires braided on the outer surface of the above-mentioned insulating layer was formed. The formed electromagnetic wave shielding layer had a resistance of 1.3 Ω/m in the lengthwise direction. Thus, a sensor member having an average diameter of about 1.8 mm and having a core, a conductive layer, an insulating layer, and an electromagnetic wave shielding layer which are stacked on one another in this order was prepared.

The results of evaluation of the core material were shown in Table 1, and the results of evaluation of the present sensor body and performance evaluation of the sensor member were shown in Table 2.

As can be seen from Tables 1 and 2, in Example 1, the relative evaluation of the frictional force caused between the core and the conductor is particularly excellent, as compared to those in other examples, and the construction is excellent in stability of the production of the sensor body and in handling of the sensor body being used. Further, in Example 1, the measurement precision (maximum error (maximum difference between the E value and the e value)) and the durability (maximum error after the creep test) of the sensor member both at 25° C. and 60° C. are excellent, and the sensor member is suitable for non-destructive and continuous measurement and further has high repeatability, and has high reliability even when used in a severe surrounding environment.

Example 1-1

The sensor member prepared in Example 1 was used as a center axis, and further the surface of the sensor member was subjected to extrusion coating with an olefin thermoplastic elastomer in a molten state from a dice of a melt-extruder, preparing a sensor member having a coating of an insulating protective layer having a thickness of 0.25 mm.

With respect to the present sensor member, even after immersed in seawater at 30° C. for 2 weeks, the appearance had no change, and almost no change was found in the electrical resistance values of the conductor and the electromagnetic wave shielding layer. Meanwhile, after the test in which the sensor member was allowed to stand in a high-temperature high-humidity environment at 85% RH at 60° C. for 1,000 hours, a change of the hue of the protective layer as the uppermost surface layer was observed, but almost no change was found in the electrical resistance values of the conductor and the electromagnetic wave shielding layer, and there was no problem from a practical point of view. Further, after performing the accelerated ultraviolet exposure test (super xenon test; ultraviolet light irradiance: 180 W/m2; 500 hours), a change of the hue of the protective layer as the uppermost surface layer was observed, but almost no change was found in the electrical resistance values of the conductor and the electromagnetic wave shielding layer, and there was no problem from a practical point of view.

Example 1-2

A sensor member was prepared in substantially the same manner as in Example 1 except that the insulating layer and protective layer made of an olefin thermoplastic elastomer in Example 1 were changed to an insulating layer made of a vulcanized silicone rubber. For the purpose of improving the shape stability and weathering resistance of the insulating layer and protective layer made of a silicone rubber, the sensor member prepared was subjected to heat treatment for secondary vulcanization.

With respect to the present sensor member, even after immersed in seawater at 30° C. for 2 weeks, the appearance had no change, and almost no change was found in the electrical resistance values of the conductor and the electromagnetic wave shielding layer. Further, even after the test in which the sensor member was allowed to stand in a high-temperature high-humidity environment at 85% RH at 60° C. for 1,000 hours, almost no change was found in the hue of the protective layer as the uppermost surface layer, and almost no change was found in the electrical resistance values of the conductor and the electromagnetic wave shielding layer. Furthermore, even after performing the accelerated ultraviolet exposure test (super xenon test; ultraviolet light irradiance: 180 W/m2; 500 hours), almost no change was found in the hue of the protective layer as the uppermost surface layer, and almost no change was found in the electrical resistance values of the conductor and the electromagnetic wave shielding layer, and there was no problem from a practical point of view.

Example 2

In Example 1, twisting the core fiber due to the frictional force between the core fiber and the conductor during the winding of the conductor caused the core fiber after winding the conductor to be twisted, and, in view of this, a sensor body was prepared in such a manner that, before winding the conductor, the core fiber was twisted in advance in the direction opposite to the winding direction for the conductor. The twist was measured in the same manner as in Example 1, and, as a result, it was found that the twist was about 50 T/m (twist multiplier: 0.31).

The results of evaluation of the core material were shown in Table 1, and the results of evaluation of the present sensor body and performance evaluation of the sensor member were shown in Table 2.

As can be seen from Tables 1 and 2, in Example 2, the relative evaluation of the frictional force caused between the core and the conductor is particularly excellent, as compared to those in other examples, and the construction is excellent in stability of the production of the sensor body and in handling of the sensor body being used. Further, in Example 2, the measurement precision (maximum error (maximum difference between the E value and the e value)) and the durability (maximum error after the creep test) of the sensor member both at 25° C. and 60° C. are particularly excellent, and the sensor member is suitable for non-destructive and continuous measurement and further has high repeatability, and has extremely high reliability even when used in a severe surrounding environment.

Example 3

A sensor member was prepared in substantially the same manner as in Example 1 except that, as a conductor, a copper wire (round wire) having an enamel insulating layer and having a diameter of 0.08 mm was used and wound round the core fiber under conditions such that the number of winding was 10,000 T/m to prepare a sensor body. The gap in the wound copper foil wires was about 0.02 mm on average.

The results of evaluation of the core material were shown in Table 1, and the results of evaluation of the present sensor body and performance evaluation of the sensor member were shown in Table 2.

As can be seen from Tables 1 and 2, in Example 3, the relative evaluation of the frictional force caused between the core and the conductor is particularly excellent, as compared to those in other examples, and the construction is excellent in stability of the production of the sensor body and in handling of the sensor body being used. Further, in Example 3, the measurement precision (maximum error (maximum difference between the E value and the e value)) and the durability (maximum error after the creep test) of the sensor member both at 25° C. and 60° C. are excellent, and the sensor member is suitable for non-destructive and continuous measurement and further has high repeatability, and has high reliability even when used in a severe surrounding environment.

Example 4

A sensor member was prepared in substantially the same manner as in Example 1 except that a monofilament of a PTT fiber (SOLOTEX, manufactured by Asahi Kasei Corporation; fineness: 390 dtex; approximate diameter of the fiber bundle: about 0.19 mm; relative permeability: 1.0) was used as a core fiber yarn.

The results of evaluation of the core material were shown in Table 1, and the results of evaluation of the present sensor body and performance evaluation of the sensor member were shown in Table 2.

As can be seen from Tables 1 and 2, in Example 4, the relative evaluation of the frictional force caused between the core and the conductor is excellent, as compared to those in other examples, and the construction is excellent in stability of the production of the sensor body and in handling of the sensor body being used. Further, in Example 4, the measurement precision (maximum error (maximum difference between the E value and the e value)) and the durability (maximum error after the creep test) of the sensor member both at 25° C. and 60° C. are excellent, and the sensor member is suitable for non-destructive and continuous measurement and further has high repeatability, and has high reliability even when used in a severe surrounding environment.

Example 5

A sensor member was prepared in substantially the same manner as in Example 1 except that a monofilament of a PET fiber (Tetoron, manufactured by Teijin Frontier Co., Ltd.; fineness: 230 dtex; approximate diameter of the fiber bundle: about 0.15 mm; relative permeability: 1.0) was used as a core fiber yarn.

The results of evaluation of the core material were shown in Table 1, and the results of evaluation of the present sensor body and performance evaluation of the sensor member were shown in Table 2.

As can be seen from Tables 1 and 2, in Example 5, the relative evaluation of the frictional force caused between the core and the conductor is slightly poor, as compared to those in other Examples, but no problem was caused in stability of the production of the sensor body or handling of the sensor body being used. Further, in Example 5, the measurement precision (maximum error (maximum difference between the E value and the e value)) and the durability (maximum error after the creep test) of the sensor member both at 25° C. and 60° C. are slightly poor, as compared to those in other Examples, but the sensor member can exhibit satisfactory performance depending on the application (object to be measured), and is suitable for non-destructive and continuous measurement and further has repeatability and reliability.

Example 6

A sensor member was prepared in substantially the same manner as in Example 1 except that a multifilament of a liquid crystalline polyester fiber (Zxion, manufactured by KB Seirein Ltd.; fineness: 440 dtex; approximate diameter of the fiber bundle: about 0.21 mm; relative permeability: 1.0) was used as a core fiber yarn.

The results of evaluation of the core material were shown in Table 1, and the results of evaluation of the present sensor body and performance evaluation of the sensor member were shown in Table 2.

As can be seen from Tables 1 and 2, in Example 6, the relative evaluation of the frictional force caused between the core and the conductor is slightly poor, as compared to those in other Examples, but no problem was caused in stability of the production of the sensor body or handling of the sensor body being used. Further, in Example 6, the measurement precision (maximum error (maximum difference between the E value and the e value)) and the durability (maximum error after the creep test) of the sensor member both at 25° C. and 60° C. are slightly poor, as compared to those in other Examples, but the sensor member can exhibit satisfactory performance depending on the application (object to be measured), for example, in which the elongation amount and/or elongation ratio is small, and is suitable for non-destructive and continuous measurement and further has repeatability and reliability.

Example 7

A sensor member was prepared in substantially the same manner as in Example 1 except that there was used a sensor body in which, as a conductor, a silver-plated rolled copper foil having a thickness of about 0.029 mm and a width of about 0.7 mm was wound under conditions such that the number of winding was about 1,200 T/m. The gap in the wound copper foils was about 0.13 mm on average.

With respect to the performance properties of the present sensor member, the dispersion of the maximum and the minimum of the measured values of the difference between the E value and the e value in the measurement made for 5 test specimens was increased to about ±12%, while that in Example 1 was about ±9%, but, in respect of the results of the evaluation of the error, the performance properties were equivalent to those of the sensor member in Example 1 shown in Tables 1 and 2.

Example 8

A sensor member was prepared in substantially the same manner as in Example 3 except that, as a conductor, a copper wire (round wire) having an enamel insulating layer and having a diameter of 0.05 mm was used and wound round the core fiber under conditions such that the number of winding was 15,000 T/m to prepare a sensor body. The gap in the wound copper foils was about 0.02 mm on average.

With respect to the performance properties of the present sensor member, the dispersion of the maximum and the minimum of the measured values of the difference between the E value and the e value in the measurement made for 5 test specimens was increased to about ±10%, while that in Example 3 was about ±7%, but, in respect of the results of the evaluation of the error, the performance properties were equivalent to those of the sensor member in Example 3 shown in Tables 1 and 2.

TABLE 1

| Details of test | Measurement item | | Example 1 Para-aramid fiber | Example 2 Para-aramid fiber | Example 3 Para-aramid fiber | Example 4 PTT Fiber | Example 5 PET Fiber | Example 6 Liquid crystalline polyester fiber |
|---|---|---|---|---|---|---|---|---|
| | | Temperature Object | | | | | | |
| Evaluation of core material | Tensile test (Load/elongation curve measurement) | 25° C. Residual strain at 2% elongation (%) | 0.2 | 0.2 | 0.2 | 0.3 | 0.4 | 0.3 |
| | | 60° C. Residual strain at 2% elongation (%) | 0.2 | 0.2 | 0.2 | 0.4 | 0.5 | 0.4 |
| | | 25° C. Residual strain at 3% elongation (%) | 0.3 | 0.3 | 0.3 | 0.3 | 0.5 | 0.4 |
| | | 60° C. Residual strain at 3% elongation (%) | 0.3 | 0.3 | 0.3 | 0.4 | 0.6 | 0.5 |
| | | 25° C. Residual strain at 4% elongation (%) | 0.4 | 0.4 | 0.4 | 0.4 | 0.6 | Unmeasurable (Breaking during test) |
| | | 60° C. Residual strain at 4% elongation (%) | 0.4 | 0.4 | 0.4 | 0.5 | 0.7 | Unmeasurable (Breaking during test) |
| | | 25° C. Tensile modulus (GPa) | 81 | 81 | 81 | 2.8 | 17.3 | 84 |
| | | 60° C. Tensile modulus (GPa) | 69 | 69 | 69 | 2.7 | 16.5 | 70 |
| | | 25° C. Tensile strength (GPa) | 2.9 | 2.9 | 2.9 | 0.3 | 0.9 | 2.7 |
| | | 60° C. Tensile strength (GPa) | 2.6 | 2.6 | 2.6 | 0.3 | 0.8 | 2.4 |
| | | 25° C. Tensile elongation (%) | 4.2 | 4.2 | 4.2 | 35 | 7.5 | 3.5 |
| | | 60° C. Tensile elongation (%) | 4.3 | 4.3 | 4.3 | 27 | 7.2 | 3.5 |
| | Thermal dimensional shrinkage rate | 60° C. Conditions for being allowed to stand for 2 hours (%) | 0 | 0 | 0 | 0.1 | 0.2 | 0 |
| | Creep test | 25° C. Creep rate (%/min) | 0.0004 | 0.0004 | 0.0004 | 0.001 | 0.0023 | 0.0008 |
| | | 60° C. Creep rate (%/min) | 0.001 | 0.001 | 0.001 | 0.0017 | 0.0031 | 0.0015 |

TABLE 2

| Details of test | Measurement item | | Example 1 Para-aramid fiber | Example 2 Para-aramid fiber | Example 3 Para-aramid fiber | Example 4 PTT Fiber | Example 5 PET Fiber | Example 6 Liquid crystalline polyester fiber |
|---|---|---|---|---|---|---|---|---|
| | | Temperature Object | | | | | | |
| Evaluation of sensor body | ① Production suitability Frictional force between core and conductor | — Relative evaluation of frictional force | ⊙ | ⊙ | ⊙ | ○ | Δ | Δ |
| Performance evaluation of sensor member | ② Measurement precision Maximum error (Maximum difference between E value and e value) | 25° C. 2% Elongation conditions | 0.5 | 0.3 | 0.5 | 0.5 | 0.6 | 0.6 |
| | | 60° C. 2% Elongation conditions | 0.5 | 0.3 | 0.5 | 0.6 | 0.8 | 0.8 |
| | | 25° C. 3% Elongation conditions | 0.6 | 0.4 | 0.5 | 0.6 | 0.8 | 0.7 |
| | | 60° C. 3% Elongation conditions | 0.7 | 0.4 | 0.7 | 0.7 | 0.9 | 0.9 |
| | | 25° C. 4% Elongation conditions | 0.8 | 0.5 | 0.7 | 0.7 | 1 | Unmeasurable (Breaking during test) |

TABLE 2-continued

| Details of test | Measurement item | | Example 1 Para-aramid fiber | Example 2 Para-aramid fiber | Example 3 Para-aramid fiber | Example 4 PTT Fiber | Example 5 PET Fiber | Example 6 Liquid crystalline polyester fiber |
|---|---|---|---|---|---|---|---|---|
| | Temperature | Object | | | | | | |
| | 60° C. | 4% Elongation conditions | 0.8 | 0.5 | 0.8 | 0.8 | 1.2 | Unmeasurable (Breaking during test) |
| ③ Durability Maximum error after creep test | 25° C. | 2% Elongation conditions | 0.7 | 0.5 | 0.7 | 0.9 | 1.3 | 1 |
| | 60° C. | 2% Elongation conditions | 0.7 | 0.5 | 0.7 | 1 | 1.6 | 1.1 |
| | 25° C. | 3% Elongation conditions | 0.8 | 0.6 | 0.7 | 1.1 | 1.5 | 1.1 |
| | 60° C. | 3% Elongation conditions | 0.9 | 0.6 | 0.9 | 1.2 | 1.7 | 1.3 |
| | 25° C. | 4% Elongation conditions | 1 | 0.7 | 0.9 | 1.2 | 1.8 | Unmeasurable (Breaking during test) |
| | 60° C. | 4% Elongation conditions | 1 | 0.7 | 1 | 1.3 | 2 | Unmeasurable (Breaking during test) |
| Total evaluation | Total evaluation by ① ② ③ | | ○ | ⊙ | ○ | ○ | △ | △ |

Comparative Example 1

Preparation of a sensor member was attempted in substantially the same manner as in Example 1 except that a multifilament of an urethane elastic fiber (Roica, manufactured by Asahi Kasei Corporation; fineness: 940 dtex) was used as a core fiber yarn. However, in the step of winding the conductor round the core fiber using a covering machine, the core fiber was considerably stretched due to the tension applied during the processing using the covering machine, and only the core fiber suffered marked shrinkage when removing the tension in bobbin take-up, so that the form of the sensor member was markedly changed, making it impossible to conduct the subsequent step.

The results of evaluation of the core material were shown in Table 3, and the results of evaluation of the present sensor body and performance evaluation of the sensor member were shown in Table 4.

Comparative Example 2

A sensor member was prepared in substantially the same manner as in Example 1 except that a multifilament of an ultra-high-molecular weight polyethylene fiber (Izanas SK60, manufactured by Toyobo Co., Ltd.; fineness: 1,760 dtex; approximate diameter of the fiber bundle: 0.59 mm) was used as a core fiber yarn.

The results of evaluation of the core material were shown in Table 3, and the results of evaluation of the present sensor body and performance evaluation of the sensor member were shown in Table 4.

Comparative Example 3

A sensor member was prepared in substantially the same manner as in Example 3 except that, as a conductor, a silver-plated rolled copper foil having a thickness of about 0.029 mm and a width of about 0.7 mm was used and wound round the core fiber under conditions such that the number of winding was 200 T/m to prepare a sensor body. The gap in the wound copper foil wires was about 3.3 mm on average.

With respect to the performance properties of the present sensor member, the dispersion of the maximum and the minimum of the measured values of the difference between the E value and the e value in the measurement made for 5 test specimens was in the range of from ±25 to 35%, while that in Example 1 was about ±9%, and such a result was repeatedly obtained and hence, the error was not able to be evaluated.

The above results clearly showed that the repeatability in the measurement of the sensor member in the present Comparative Example was markedly poor, as compared to those in the Examples.

Comparative Example 4

A sensor member was prepared in substantially the same manner as in Example 1 except that two silver-plated rolled copper foils each having a thickness of about 0.025 mm and a width of about 0.3 mm were used and successively wound under the conditions at 2,700 turns/m in the opposite direction to prepare a sensor body in the state in which two layers of coils were stacked. The sensor member was connected to an instrument in a state such that the conductors were soldered together at both ends of the sensor member to make an electrical connection.

With respect to the performance properties of the present sensor member, the dispersion of the maximum and the minimum of the measured values of the difference between the E value and the e value in the measurement made for 5 test specimens was ±50% or more, while that in Example 1 was about ±9%, and such a result was repeatedly obtained and hence, the error was not able to be evaluated.

The above results clearly showed that the repeatability in the measurement of the sensor member in the present Comparative Example was markedly poor, as compared to those in the Examples. The sensor member in the present Comparative Example markedly changes in the electric properties (inductance and resistance) of the coil during the test, and the reason for this is presumed that the two conductors are contacted at various positions in the lengthwise direction to cause electrical conduction.

TABLE 3

| Details of test | | Temperature | Measurement item Object | Comparative Example 1 Urethane elastic fiber | Comparative Example 2 Ultra-high-molecular weight PE fiber |
|---|---|---|---|---|---|
| Evaluation of core material | Tensile test (Load/elongation curve measurement) | 25° C. | Residual strain at 2% elongation (%) | Difficult to conduct measurement | 0.7 |
| | | 60° C. | Residual strain at 2% elongation (%) | (Material is too easily stretched to set a load for elongation ratio) | 1.3 |
| | | 25° C. | Residual strain at 3% elongation (%) | | 0.9 |
| | | 60° C. | Residual strain at 3% elongation (%) | | 1.7 |
| | | 25° C. | Residual strain at 4% elongation (%) | | Unmeasurable (Breaking during test) |
| | | 60° C. | Residual strain at 4% elongation (%) | | 2.3 |
| | | 25° C. | Tensile modulus (GPa) | 0.1 | 128 |
| | | 60° C. | Tensile modulus (GPa) | 0.1 | 93 |
| | | 25° C. | Tensile strength (GPa) | 0.02 | 25 |
| | | 60° C. | Tensile strength (GPa) | 0.02 | 21 |
| | | 25° C. | Tensile elongation (%) | 300 | 3.7 |
| | | 60° C. | Tensile elongation (%) | 300 | 4.1 |
| | Thermal dimensional shrinkage rate | 60° C. | Conditions for being allowed to stand for 2 hours (%) | 2.7 | 0.2 |
| | Creep test | 25° C. | Creep rate (%/min) | 0.22 | 0.004 |
| | | 60° C. | Creep rate (%/min) | 0.41 | 0.061 |

TABLE 4

| Details of test | | Temperature | Measurement item Object | Comparative Example 1 Urethane elastic fiber | Comparative Example 2 Ultra-high-molecular weight PE fiber |
|---|---|---|---|---|---|
| Evaluation of sensor body | ① Production suitability Frictional force between core and conductor | — | Relative evaluation of frictional force | Elongation is too large, test is impossible | x |
| Performance evaluation of sensor member | ② Measurement precision Maximum error (Maximum difference between E value and e value) | 25° C. | 2% Elongation conditions | Unmeasurable (Shape was not stabilized, so that tensile test could not be stably conducted) | 1.1 |
| | | 60° C. | 2% Elongation conditions | | 1.7 |
| | | 25° C. | 3% Elongation conditions | | 1.6 |
| | | 60° C. | 3% Elongation conditions | | 2.2 |
| | | 25° C. | 4% Elongation conditions | | Unmeasurable (Breaking during test) |
| | | 60° C. | 4% Elongation conditions | | 2.9 |
| | ③ Durability Maximum error after creep test | 25° C. | 2% Elongation conditions | | 16.2 |
| | | 60° C. | 2% Elongation conditions | | 17 |
| | | 25° C. | 3% Elongation conditions | | 16.9 |
| | | 60° C. | 3% Elongation conditions | | 17.6 |
| | | 25° C. | 4% Elongation conditions | | 17.3 |
| | | 60° C. | 4% Elongation conditions | | 18.1 |
| Total evaluation | | | Total evaluation by ① ② ③ | x | x |

REFERENCE SIGNS LIST

1: Core; 2: Outer surface portion; 3: Conductor; 4: Insulating layer; 5: Electromagnetic wave shielding layer; 6: Kent paper; 7: Test material (core material); 8: Adhesive; 9: Instrument (LCR meter); 10: Test fixture; 11: Sensor member; 12: Chuck of a tensile tester

The invention claimed is:

1. A sensor device comprising:
 a sensor member having a core using a core material having a residual strain at 2% elongation of 0.4% or less,
 a conductor which has an electrical resistance of 1 Ω/m or less, and which is wound round an outer surface portion of the core in a coil form,
 an electromagnetic wave shielding layer for shielding the conductor from an extraneous electromagnetic wave, and
 an insulating layer having an electrical insulation function between the conductor and the electromagnetic wave shielding layer; and
 a measuring means for detecting an electric signal from the sensor member to measure an elongation of the sensor member based on a change of the electric signal;

wherein the core material has a tensile modulus of 1 to 250 GPa, as measured at 25° C., a tensile strength as measured at 60° C. is 0.3 to 10 GPa, and a tensile elongation at break as measured at 25° C. is 3 to 50%, and the core has a diameter of 0.08 to 0.6 mm.

2. The sensor device according to claim 1, wherein the measuring means has a detector for detecting an impedance change, and an arithmetic part for conducting a calculation of an elongation amount and/or an elongation ratio of a measurement specimen based on the impedance change.

3. The sensor device according to claim 2, wherein the arithmetic part conducts a calculation of an elongation amount and/or an elongation ratio based on inductance change among the values detected by the detector.

4. The sensor device according to claim 1, wherein the measuring means has a judgment means for judging an abnormal state of the sensor member and/or measurement specimen.

5. A method for measuring an elongation amount and/or an elongation ratio, comprising a step of measuring an elongation amount and/or an elongation ratio of a measurement specimen with a sensor device comprising:

a sensor member having a core using a core material having a residual strain at 2% elongation of 0.4% or less, a conductor which has an electrical resistance of 1 Ω/m or less, and which is wound round an outer surface portion of the core in a coil form, an electromagnetic wave shielding layer for shielding the conductor from an extraneous electromagnetic wave, and an insulating layer having an electrical insulation function between the conductor and the electromagnetic wave shielding layer; and a measuring means for detecting an electric signal from the sensor member to measure an elongation of the sensor member based on a change of the electric signal;

wherein the core material has a tensile modulus of 1 to 250 GPa, as measured at 25° C., a tensile strength as measured at 60° C. is 0.3 to 10 GPa, and a tensile elongation at break as measured at 25° C. is 3 to 50%, and the core has a diameter of 0.08 to 0.6 mm.

6. The method according to claim 5, wherein at least two or more sensor members having different lengths are arranged on the measurement specimen, and, using a difference between the elongation amounts and/or elongation ratio of two or more arbitrary sensor members, a elongation amount and/or a elongation ratio in an uncommon section in which the two arbitrary sensor members do not overlap is determined, measuring an elongation amount and/or an elongation ratio of the measurement specimen in an arbitrary section.

* * * * *